US009277044B2

(12) United States Patent
Kahn et al.

(10) Patent No.: US 9,277,044 B2
(45) Date of Patent: Mar. 1, 2016

(54) TRANSPORTABLE WIRELESS LOUDSPEAKER AND SYSTEM AND METHOD FOR MANAGING MULTI-USER WIRELESS MEDIA PLAYBACK OVER A MEDIA PLAYBACK SYSTEM

(71) Applicants: Steven P. Kahn, Sykesville, MD (US); Eric A. Sanders, Reisterstown, MD (US); Stuart W. Lumsden, Baltimore, MD (US)

(72) Inventors: Steven P. Kahn, Sykesville, MD (US); Eric A. Sanders, Reisterstown, MD (US); Stuart W. Lumsden, Baltimore, MD (US)

( * ) Notice: Subject to any disclaimer, the term of this patent is extended or adjusted under 35 U.S.C. 154(b) by 37 days.

(21) Appl. No.: 14/269,549

(22) Filed: May 5, 2014

(65) Prior Publication Data

US 2015/0319288 A1 Nov. 5, 2015

Related U.S. Application Data

(60) Provisional application No. 61/821,494, filed on May 9, 2013.

(51) Int. Cl.
*H04B 7/00* (2006.01)
*H04M 1/725* (2006.01)
*H04W 4/00* (2009.01)

(52) U.S. Cl.
CPC .......... *H04M 1/72558* (2013.01); *H04W 4/008* (2013.01)

(58) Field of Classification Search
CPC .............................. H04W 8/005; H04W 4/008
USPC ................................................ 455/41.2, 41.3
See application file for complete search history.

(56) References Cited

U.S. PATENT DOCUMENTS

| 6,005,600 | A  | * | 12/1999 | Hill ................................ 725/134 |
| 7,983,615 | B2 | * | 7/2011 | Bryce et al. ................... 455/41.2 |
| 8,175,304 | B1 | * | 5/2012 | North ............................ 381/308 |
| 8,271,713 | B2 | * | 9/2012 | Grady et al. .................. 710/303 |
| 8,614,625 | B2 | * | 12/2013 | Alsina et al. ................. 340/10.1 |
| 8,819,185 | B2 | * | 8/2014 | McLaughlin ................. 709/219 |
| 2011/0270428 | A1 | * | 11/2011 | Tam ............................... 700/94 |

* cited by examiner

*Primary Examiner* — Marceau Milord
(74) *Attorney, Agent, or Firm* — J. Andrew McKinney, Jr.; McKinney & Associates, LLC

(57) ABSTRACT

A transportable wireless loudspeaker 110 and system 100 for managing multi-user wireless media playback over a media playback system 100. Allows for multiple users on user devices 150 to share their media wirelessly by seamlessly switching between users (501, 601, 701) connected to the media playback system 100. The ability to have multiple users sharing their media provides for more sources of media to be played.

18 Claims, 15 Drawing Sheets

FIG. 13
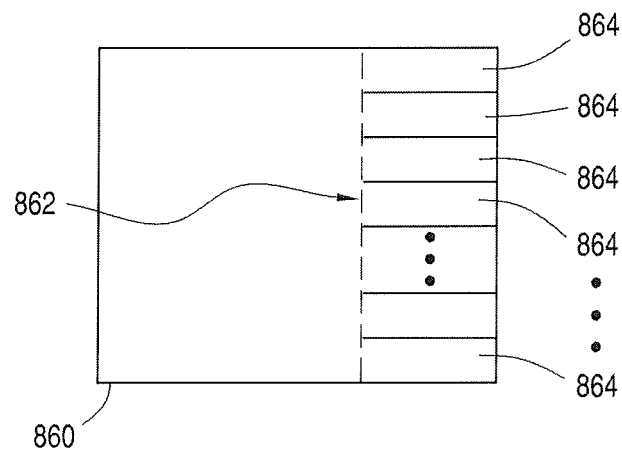
FIG. 14
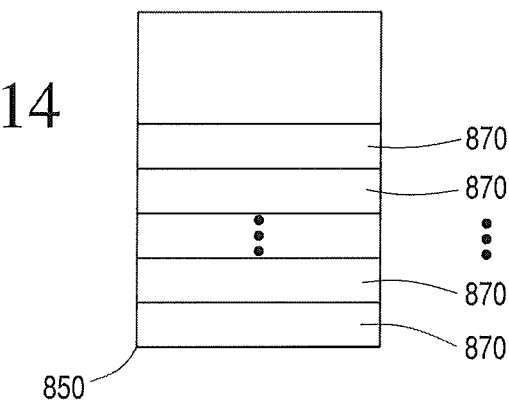
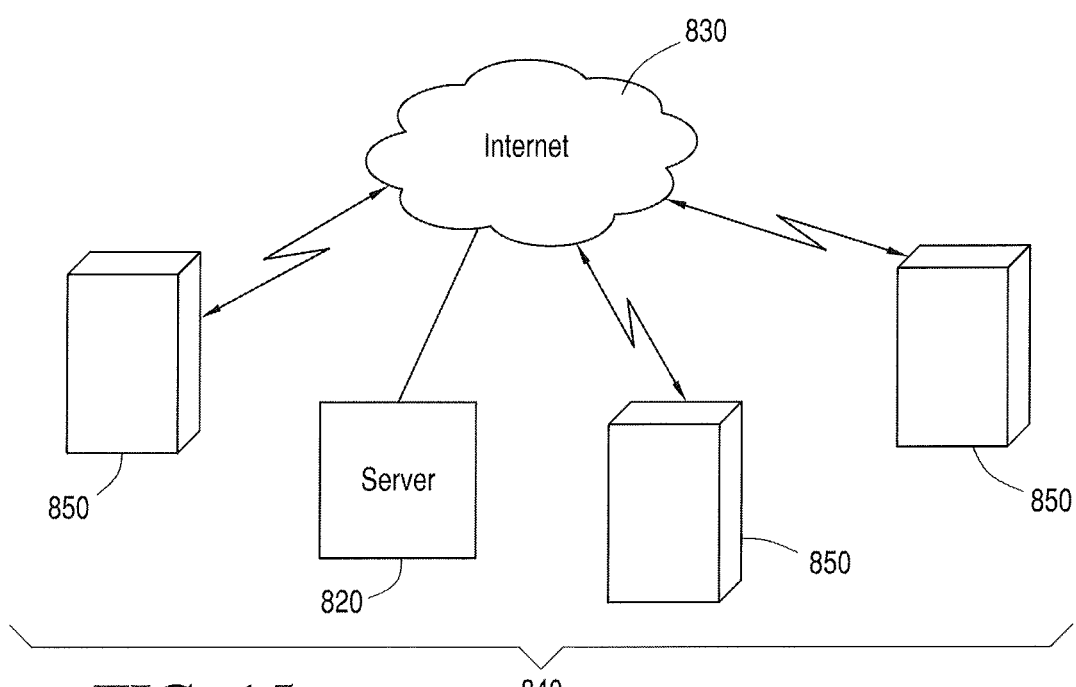
FIG. 15

TRANSPORTABLE WIRELESS LOUDSPEAKER AND SYSTEM AND METHOD FOR MANAGING MULTI-USER WIRELESS MEDIA PLAYBACK OVER A MEDIA PLAYBACK SYSTEM

PRIORITY CLAIMS AND REFERENCE RELATED APPLICATIONS

This application claims priority to related and commonly owned U.S. provisional patent application No. 61/821,494, filed May 9, 2013, the entire disclosure of which is incorporated herein by reference.

BACKGROUND OF THE INVENTION

1. Field of the Invention

The present invention relates to media playback over a wireless channel, and more specifically to transportable, wireless media playback systems adapted for use with user-provided portable media (e.g., MP3) players, smartphones and other personal electronics devices when used to store or access a user's media or music files.

2. Discussion of the Prior Art

Music listeners have been accumulating collections of music in digital form for playback over portable media (e.g., MP3) players, smartphones, tablets, personal computers and other personal electronics devices and many have chosen to listen to their music over audio playback systems configured to "dock" with those personal electronics devices. For example, the applicant's I-Sonic® music playback system (U.S. Pat. No. 7,817,812) is a popular choice for music listeners who want high-fidelity playback in a transportable, compact product.

Other users prefer to avoid having to physically connect or "dock" their personal electronics devices, and so wireless (e.g., Bluetooth™) powered speakers often combine integrated Bluetooth technology with battery power, as shown and described in U.S. Patent Application Publication US2012/0300962 (Devoto). Devoto's Bluetooth Speaker permits a listener to send music wirelessly to the stereo speaker via an iPhone™ smartphone or an MP3 player and remotely send commands between the connected personal electronics device and the speaker.

In either case users are limited in their ability to enjoy their combined music collections in group settings because switching between these collections requires switching between streaming source devices (phone, MPS player or other) and the only processes for doing so are slow, clumsy and/or disruptive to the event.

Wireless audio via Bluetooth™, for instance, is awkward to set up, however, since the user's personal electronics device and the Bluetooth™ speaker must be first "paired" and then "connected" in order to allow playback to begin, and once a user begins listening, there is not an easy way to allow another music listener to participate without "pairing" and then connecting the second user's personal electronics device. Even if the second user's personal electronics device is successfully "paired" with the Bluetooth™ speaker, the standardized Bluetooth™ system's protocols do not permit the first and second users to cooperate in creating a shared or blended audio playback experience, because the most recent user to "pair" and connect with the Bluetooth™ speaker abruptly cuts off the prior user and replaces them permanently, or until that prior user turns the tables and again connects to "play" another song with the Bluetooth™ speaker, having abruptly cut off the second user.

Wireless data transmissions using protocols such as the Bluetooth™ protocols are typically controlled by organizations which publish and enforce compliance with specifications. Such wireless transmission system specifications typically describe a wireless system designed to serve a wide range of users exchanging all kinds of information between wireless devices such as personal digital assistants (PDAs), mobile phones, laptops, computers, printers and digital cameras via a short-range radio frequency ("RF") communications channel, and transceiver compatibility among various manufacturers products is required, so the specifications tend to be rigidly followed, which means that users have limited options for sharing media over a wirelessly connected media playback component such as a wireless loudspeaker.

There is a need, therefore, for a convenient, user-friendly, flexible and unobtrusive system and method for music listeners and other users of portable media (e.g., MP3) players, smartphones and other personal electronics devices to use network together and cooperatively share a wirelessly connected media playback component such as a wireless loudspeaker and manage multi-user wireless media playback over the loudspeaker.

SUMMARY OF THE INVENTION

Accordingly, it is object of the present invention to overcome the above mentioned difficulties by providing system and method for providing media playback to a media playback device adapted to receive playback wirelessly through a plurality of portable electronic user devices via an integrated application connected to a server through the Internet.

Another object of the system and method of the present invention for providing and sharing music with multiple users in a group environment. The present system and method provides for a number of users to play their media to a group in an orderly manner.

Another object of the system and method of the present invention for providing media playback to a media playback device adapted to receive playback wirelessly through a plurality of portable electronic user devices via an integrated application connected to a server through the Internet is to play media that people in a group/party environment want to hear by allowing the people in that party play their own media.

Another object of the system and method of the present invention for providing media playback to a media playback device adapted to receive playback wirelessly through a plurality of portable electronic user devices via an integrated application connected to a server through the Internet is to play media that people in a vehicle would want to hear by allowing the people in that vehicle play their own media.

At a media playback event, a user can either Host or join a party where media is shared and played using a party-mode enabled speakers. The sharing aspect is between a portable electronic user device and a party-mode enabled speakers. The connection between the user device and the speakers is established via a wireless connection. For purposes of nomenclature, a wireless connection includes but is not limited to Bluetooth, Wi-Fi, 802.11, 3G and 4G. A user may choose to join a party that is nearby. If the user is not a Host then the user can either be a DJ or a Guest for the party. While Host for the party is the user who sets up the party, all of the users (Host, DJ, or Guest) can be a part of the party. A Host is a DJ with additional responsibilities. A user that is initially a Guest may become a DJ afterwards. The media played using party-mode enabled speakers is provided for by users who are DJs. Each DJ creates and edits a playlist from media on their own device to play with the party. The party can have a line of DJs waiting for their turn to be the Active DJ sharing their customized playlist with the party. All users are able to vote for the songs being played using the party-mode enabled speakers. The votes for the song go towards the number of points a DJ receives during the party. The party ends when the Host ends the party.

BRIEF DESCRIPTION OF THE DRAWINGS

FIG. 13 illustrates a system and method for providing media playback to a media playback device adapted to receive playback wirelessly through a plurality of portable electronic user devices via an integrated application connected to a server through the Internet using a wireless loudspeaker with a controller, in accordance with the present invention.

FIG. 14 illustrates a system and method for providing media playback to a media playback device adapted to receive playback wirelessly through a plurality of portable electronic user devices via an integrated application connected to a server through the Internet using a wireless loudspeaker using media playback files within a portable electronic user device, in accordance with the present invention.

FIG. 15 illustrates a system and method for providing media playback to a media playback device adapted to receive playback wirelessly within a Party Mode Network through a plurality of portable electronic user devices via an integrated application connected to a server through the Internet, in accordance with the present invention.

DESCRIPTION OF PREFERRED EMBODIMENTS

Figure 1:
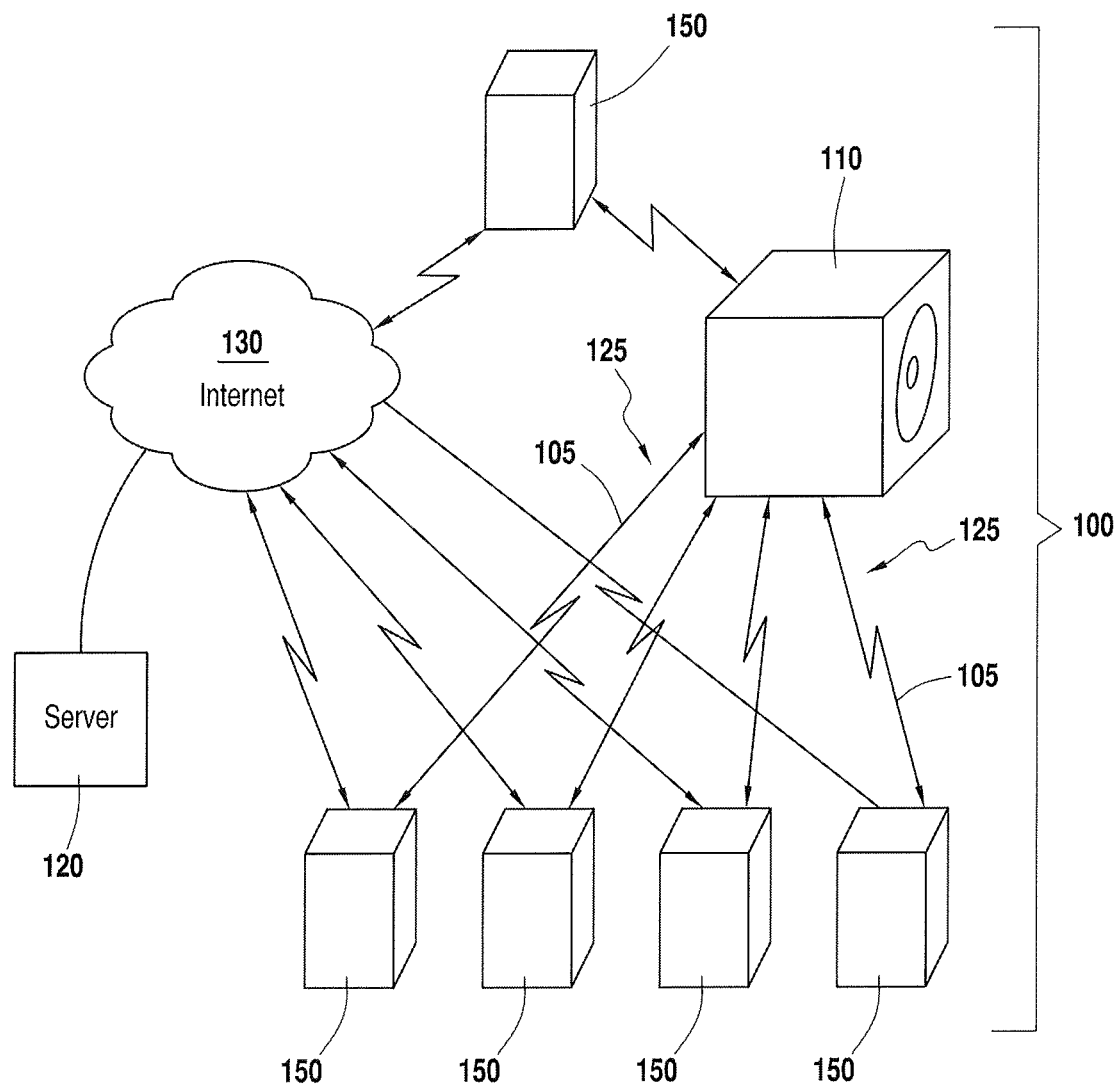
FIG. 1 illustrates a system and method for providing media playback to a media playback device adapted to receive playback wirelessly through a plurality of portable electronic user devices via an integrated application connected to a server through the Internet, in accordance with the present invention.

Referring specifically to FIG. 1, the multi-user wireless media (e.g., music) playback system 100 is configured for use with a transportable, wireless media playback component (e.g., loudspeaker) 110 and at least one server 120 which is preferably connectable to a plurality of user-provided personal electronic devices such as smartphones 150 via the Internet 130. More generally, multi-user wireless media playback system 100 is implemented and resides, in part, on one or more server(s) 120 that are preferably coupled to the Internet 130. A plurality of users each use a personal electronic device (such as an Apple® IPhone® smartphone) 150 to access the server 120 through the Internet 130. Each user's personal electronic device (or smartphone) 150 is typically used to store or provide access to a personal library or media collection which can include a plurality of music or other media files and song playlists which the user may have configured for playback over an MP3 player, a consumer Personal Digital Assistant (PDA), tablet (e.g., such as an Apple® IPad®) and/or a consumer smartphone 150. Each user's media collection (e.g., from a remotely stored iTunes® media collection) may be transmitted via various alternative connection schemes which may change as technology advances. All of the connections depicted in FIG. 1 and described above may be wireless connections using the most current technology, such as, for example, a wireless cellular or internet connection or a Wi-Fi 802.11 protocol connection. Media data signals 125 are transmitted and received between wireless loudspeaker 110 and personal electronic device 150 over wireless signal 105.

The system's server 120 is preferably implemented by the use of one or more general purpose computers, or as part of a "Cloud" server such as, for example, a scalable Rackspace® server configuration. Each of the server 120, the user smartphones 150 and the wireless loudspeaker 110 may include any type of processor, such as, for example, any type of general purpose microprocessor or microcontroller, a digital signal processing (DSP) processor, an application-specific integrated circuit (ASIC), a programmable read-only memory (PROM), or the like, and each may use its processor to read a computer-readable medium containing software that includes instructions for carrying out one or more of the functions of the respective element, as further described below. Each can also include computer memory, such as, for example, random-access memory (RAM). However, the computer memory can be any type of computer memory or any other type of electronic storage medium that is located either internally or externally to the respective element, such as, for example, read-only memory (ROM), a computer-readable medium, or the like. According to exemplary embodiments, the respective RAM and/or ROM can contain, for example, the operating program for any of the foregoing components can be stored in RAM and/or ROM and can, for example, be programmed using conventional techniques known to those having ordinary skill in the art of computer programming.

Figure 2:
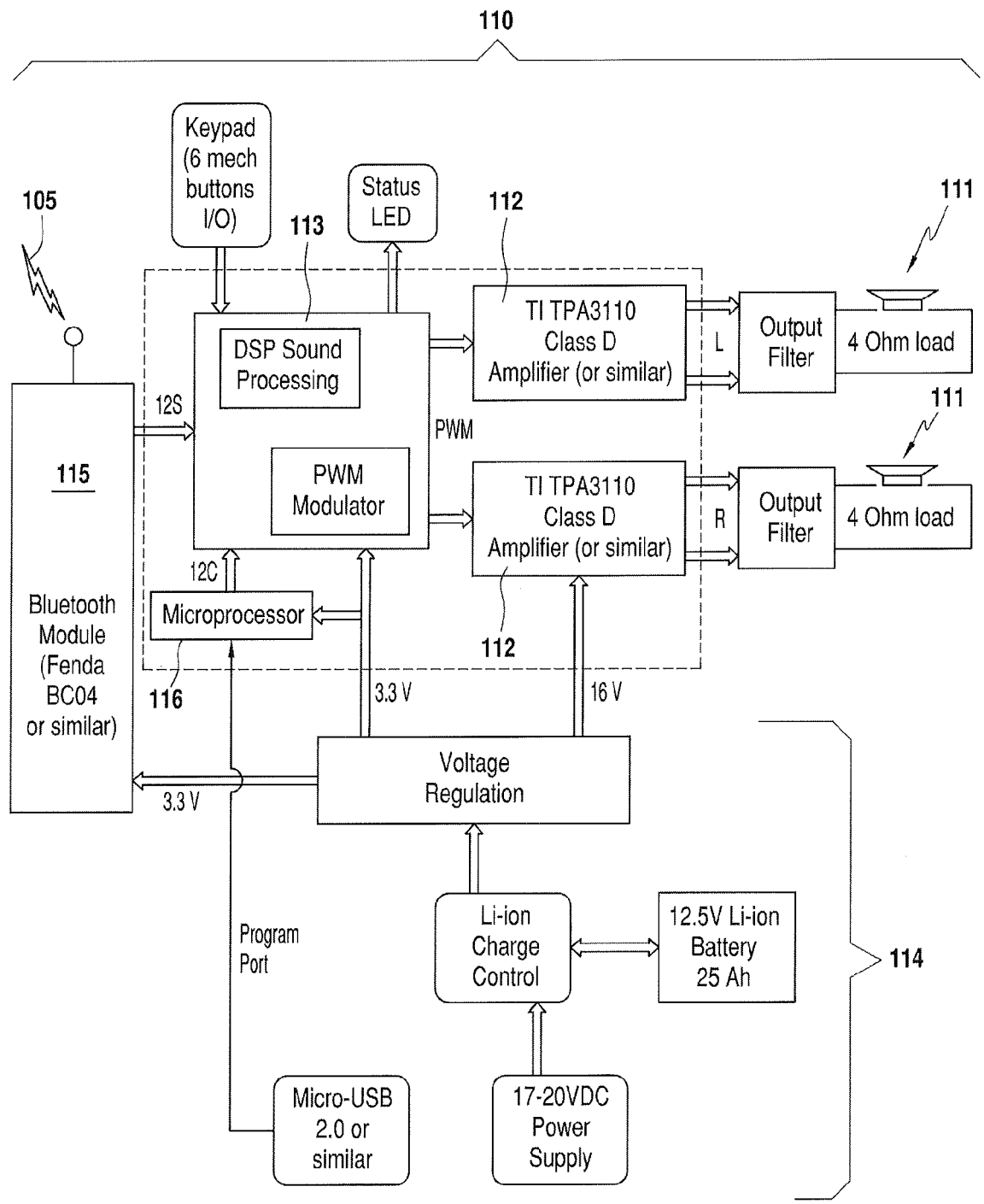
FIG. 2 illustrates a system and method for providing media playback to a media playback device adapted to receive playback wirelessly through a plurality of portable electronic user devices via an integrated application connected to a server through the Internet using a wireless loudspeaker, in accordance with the present invention.

FIG. 2 illustrates the components included within an exemplary embodiment of wireless loudspeaker 110 which preferably includes a plurality of loudspeaker drivers 111 connected to a plurality of amplifiers 112 configured to receive and amplify baseband signals generated by a DSP sound processor 113, or the like. Wireless loudspeaker 110 includes a rechargeable battery system 114, which powers all of the foregoing components as well as a wireless transceiver 115 and a microcontroller 116. Wireless loudspeaker 110 is programmed to operate in at least two distinct modes, namely "Normal" mode and "Party" mode. During media playback in Normal mode, wireless loudspeaker 110 is programmed to receive selected media data signals 125 transmitted from a single user's personal electronic device or smartphone 150 over a short range wireless communication channel and the user's media data signal is received via wireless transceiver 115 which receives and demodulates the media data signal to generate a baseband media playback signal for processing and amplification. When configured to operate in normal mode, wireless loudspeaker 110 functions in a manner, which is somewhat similar to Devoto's Bluetooth™ speaker system. When configured to operate in party mode, wireless loudspeaker 110 functions in a very different manner and is configured and programmed to function within system 100 as a multi-user media playback component which is simultaneously wirelessly connected with a selected plurality of distinct users' personal electronic devices or smartphones 150.

Figure 3:
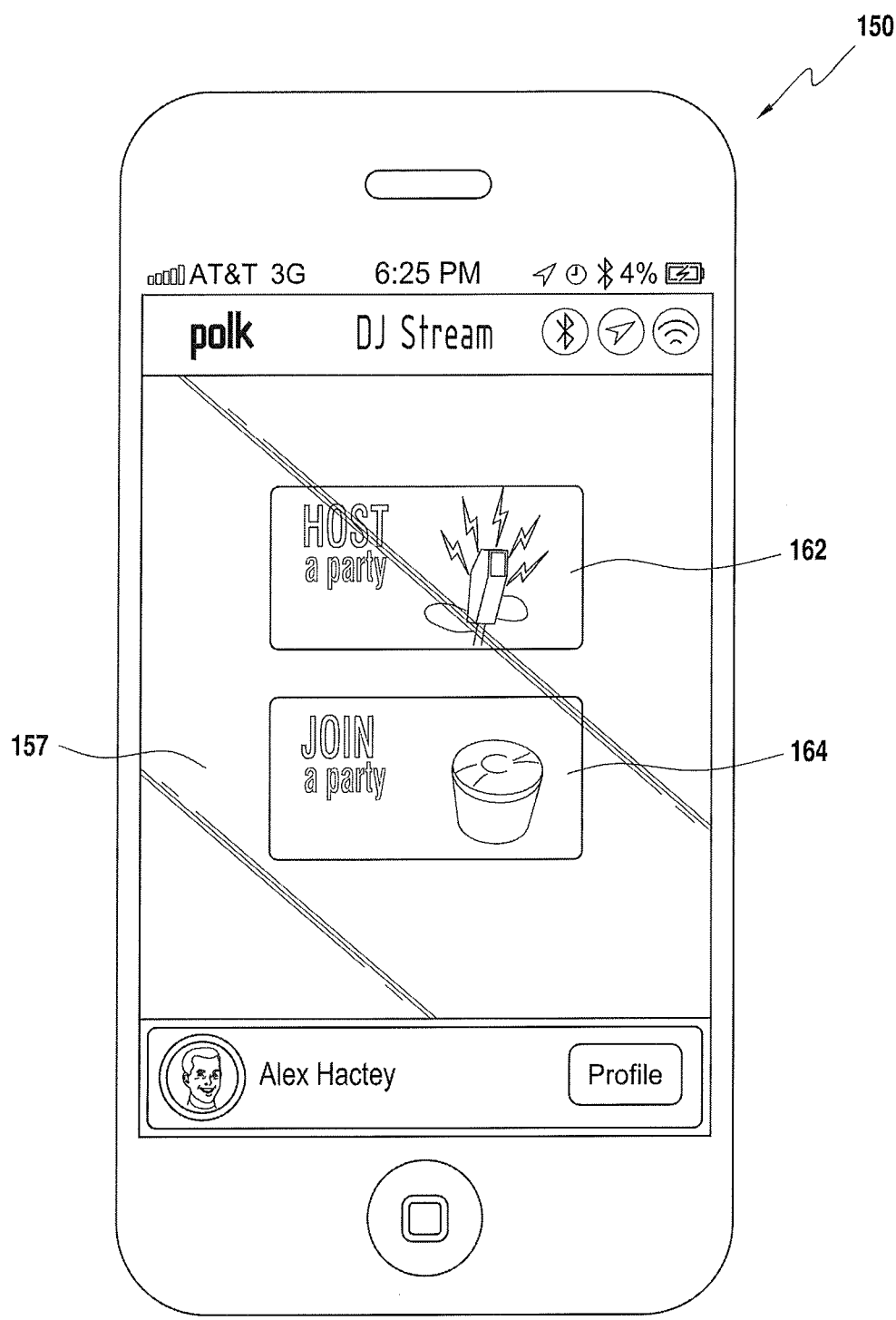
FIG. 3 illustrates a system and method for providing media playback to a media playback device adapted to receive playback wirelessly through a plurality of portable electronic user devices via an integrated application connected to a server through the Internet by using a smartphone portable electronic user device, in accordance with the present invention.
Figure 4:
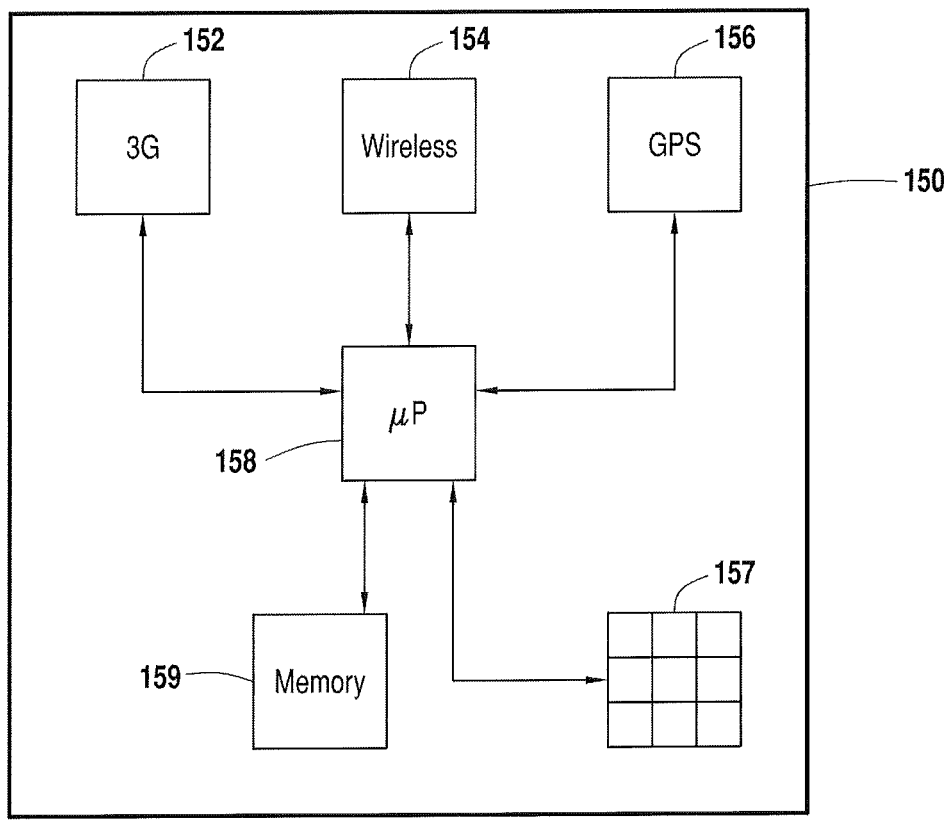
FIG. 4 illustrates a system and method for providing media playback to a media playback device adapted to receive playback wirelessly through a plurality of portable electronic user devices via an integrated application connected to a server through the Internet by using a smartphone as a portable electronic user device, in accordance with the present invention.

Turning now to FIG. 3, an exemplary user's personal electronic device or smartphone 150 is shown. In the embodiment illustrated in FIGS. 3 and 4, the user's smartphone is an Apple® iPhone® 150 and is configured with a 3G internet communications subsystem 152, a short range wireless data communications and music streaming (e.g., Bluetooth™) subsystem 154 and a GPS subsystem 156 which is configured for use with location services. Smartphone 150 is also configured with a touchscreen display 157 and a processor 158 and memory 159 programmed to control all of the foregoing elements.

Referring back to FIG. 1, each user having a personal electronic device or smartphone 150 can communicate wirelessly with server 120 via internet 130 and can also communicate wirelessly with transportable, battery powered loudspeaker system 110. In accordance with the system and method of the present invention, any user having a personal electronic device or smartphone 150 can download a software program or "App" which enables that user to participate in a multi-user shared media playback events called a "party" and can either "Host" or "join" a selected party where media such as music is played using a party-mode enabled speaker 110. In order for a user to be eligible to participate in a given party, the user will typically be able to join in the listening activity when media such as music is played for participating users over a selected party speaker 110 in a selected listening space. The user's smartphone will include a locator service and so can be used to confirm that a prospective user's physical location is within a selected distance of the party speaker 110 in the listening space. The method for establishing and managing a party event is programmed in software stored on Server 120 and in Apps downloaded by users and executed on those user's personal electronic devices or smartphones 150. The system 100 and method of the present invention provide an internet-supported network of participants or users who will cooperatively create and manage a newly created party event playlist of media, music or other audio and who will share the listening experience on the target playback party speaker 110.

Figure 5:
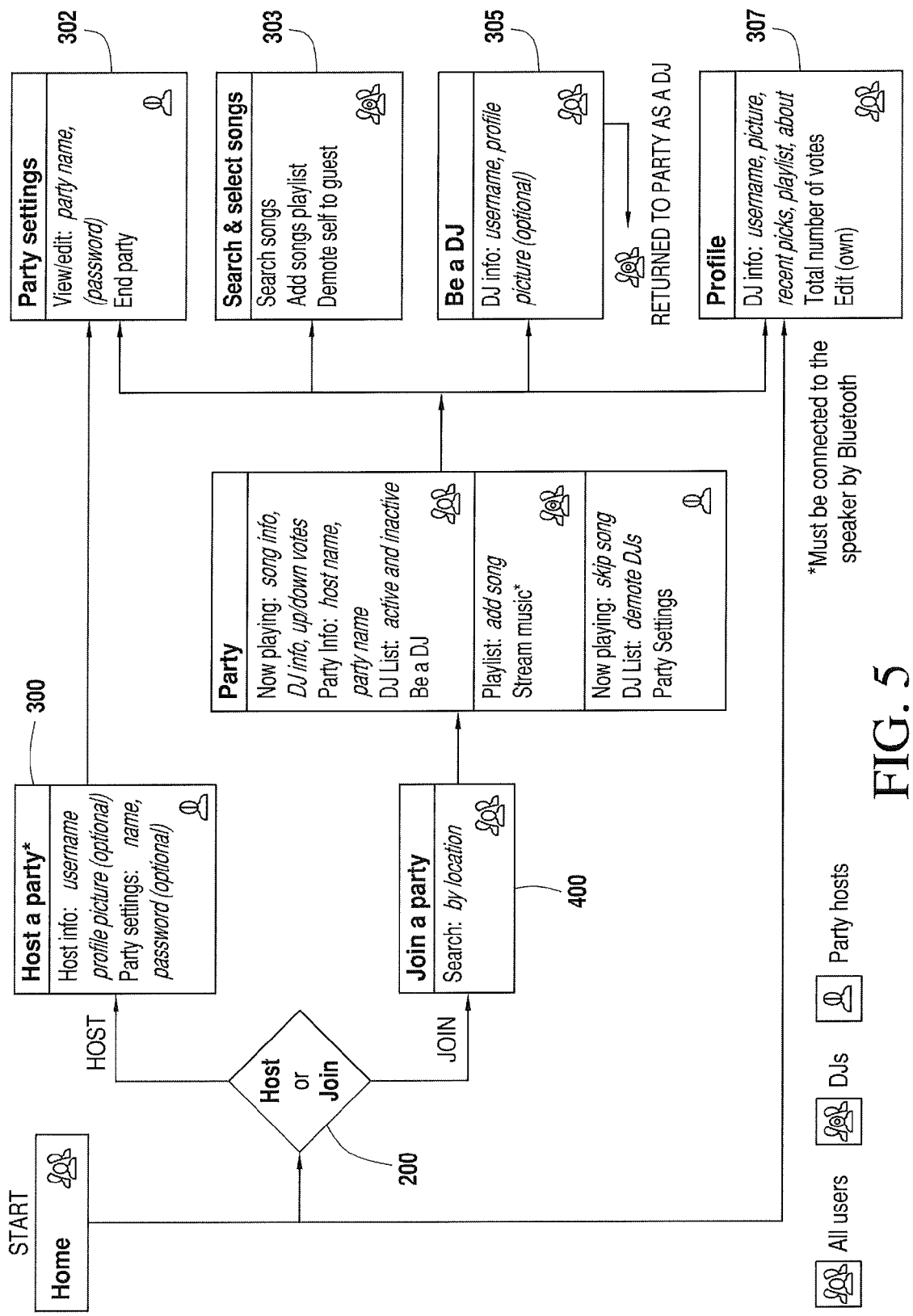
FIG. 5 illustrates a system and method for providing media playback to a media playback device adapted to receive playback wirelessly through a plurality of portable electronic user devices via an integrated application connected to a server through the Internet by providing a user the choice of either Host or join a party, in accordance with the present invention.
Figure 6:
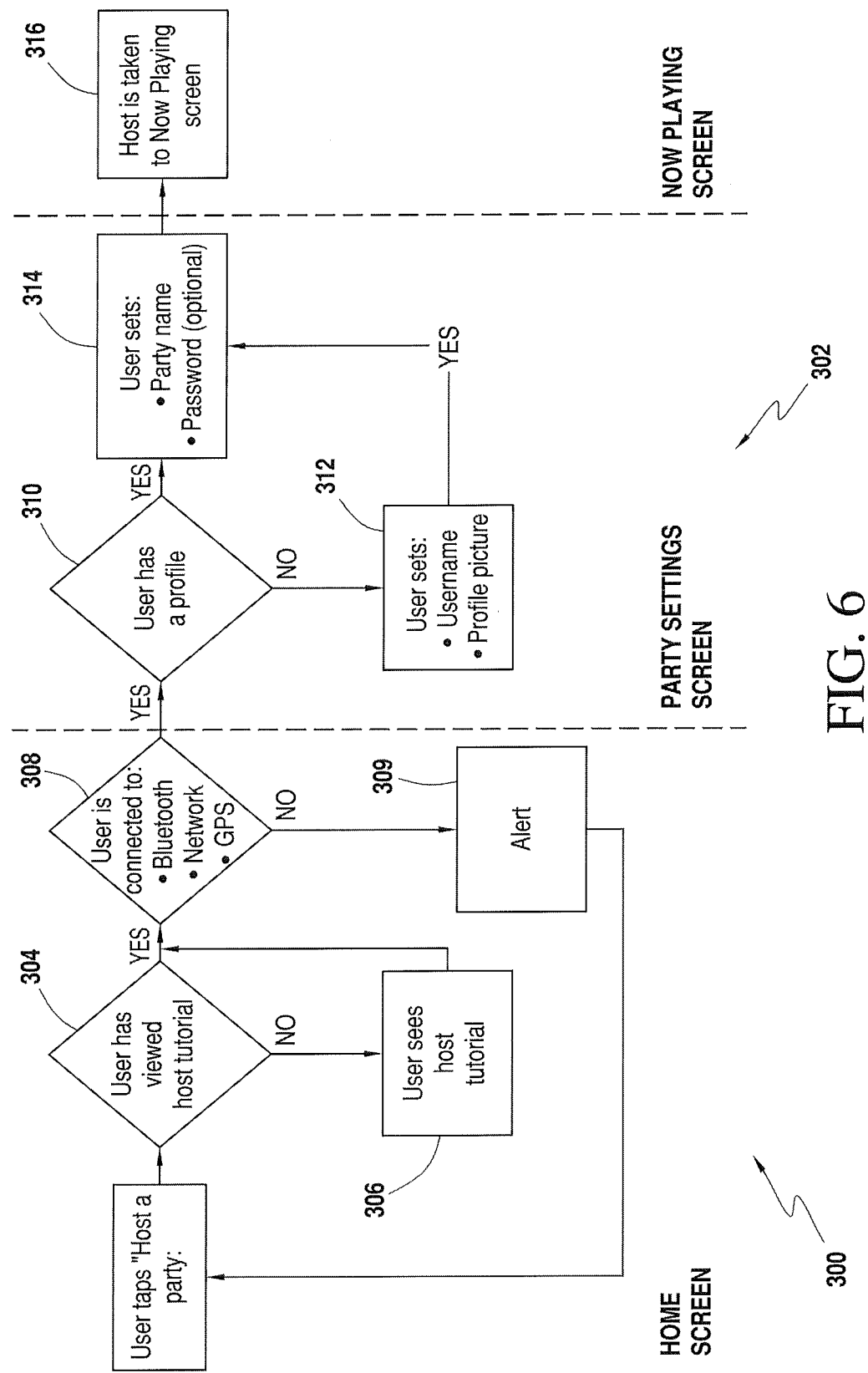
FIG. 6 illustrates a system and method for providing media playback to a media playback device adapted to receive playback wirelessly through a plurality of portable electronic user devices via an integrated application connected to a server through the Internet by Hosting a party, in accordance with the present invention.
Figure 7:
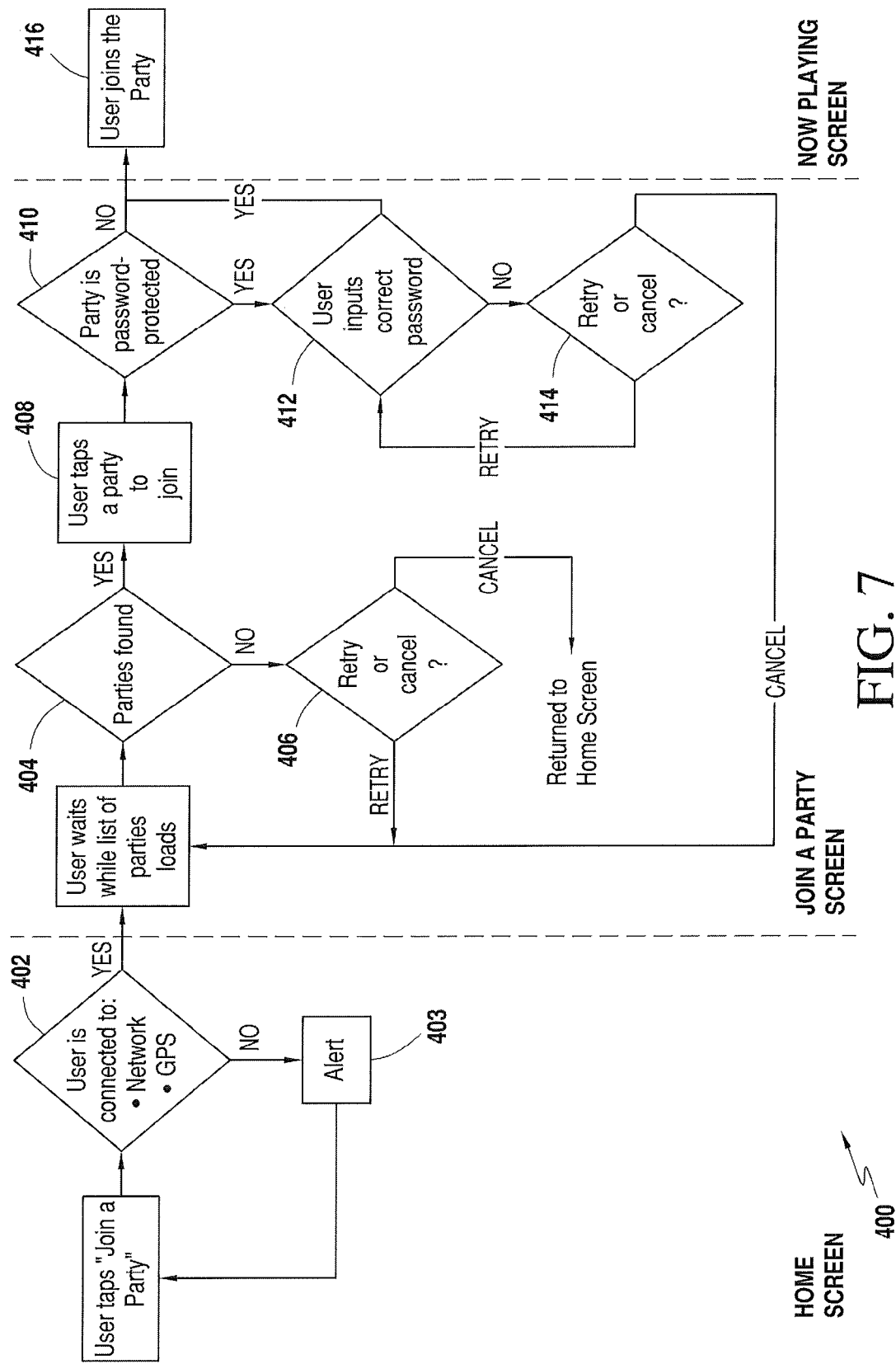
FIG. 7 illustrates a system and method for providing media playback to a media playback device adapted to receive playback wirelessly through a plurality of portable electronic user devices via an integrated application connected to a server through the Internet by Joining a party, in accordance with the present invention.

In accordance with the method of the present invention as illustrated in FIGS. 5, 6 and 7 a first user who is in relatively close physical proximity to party speaker 110 may elect to become a "Host" for a party media playback event. As illustrated in FIGS. 3 and 5, a user first decides whether to Host (initially establish and then manage) or Join a party 200. If the user decides to Host a newly established party 300, that user selects settings for the party 302 including a party name, whether a password will be required and if so, the password. The establishing user is designated as "Host" 704 for that party and essentially manages and controls participation by other participating users.

Other prospective users who have a personal electronic device or smartphone 150 with the System's App installed and activated can find the party and elect to join or become additional participating users 400, and each new user to an established party can become a media providing Active DJ 706 or a Guest 708.

Each category of participating users has a pre-programmed set of capabilities when participating in the media playback party event.

For purposes of nomenclature, the status and capabilities of each user's device 150 depend on how that user has elected to participate in the Party's media streaming and sharing activity. Participating users can vote on a selected song or media playback event, using the method described below.

A user's device 150 is characterized as being "connected" to speaker 110 when that device and speaker have both established a short-range wireless (e.g., Bluetooth™) connection 105.

A user's Party playlist is a collection of songs that a particular user has added from their music library to be played to the speaker.

A user's smartphone 150 preferably stores the user's media or music library in smartphone memory 158, and the songs or media are stored in a manner, which permits identification and access by the App for selection. The mobile App is preferably downloadable onto user devices 150 including popular smartphone platforms such as iOS 6.0 and higher, Android 4.0 and higher and optionally Windows 8 platforms.

Users participating in a party event are communicating with server 120 and party statistics are preferably accessible to an administrator for system 100 through a secure method. The system operating statistics available to the administrator controlling server 120 include the following items which are viewable from the Admin pages: Number of sessions (parties) by day since launch; Number of songs per session by day since launch; Number of devices per session by day since launch, broken out by OS and Number of votes per session by day since the initial launch of the system 100.

As noted above, each category of participating user has a specific set of capabilities. The Host 704 is the user that sets up the party. This user launches the App on his/her device and selects the 'Host a Party' 162 option. The Home page shall indicate whether the device is currently connected to the speaker. Only if it is connected will the user be able to select 'Host a Party' (300, 500).

The Host can perform the following functions:
Set the Host's profile name; this is mandatory and can be changed during a party. The Host name field is preferably limited to 20 alphanumeric characters
Set the Host profile photo (e.g., may be taken with smartphone camera (if any) or selected from user's library. This is optional and can be changed during a party.
Give party a name; this is mandatory and can be changed during a party. Field is limited to 20 alphanumeric characters.
Choose to password protect the party. The Default is OFF, but can be selected 'ON' when the party is started or during the party. Passwords, if enabled, can be any string of alphanumeric characters. Both lower case and upper case characters are supported and Passwords, if enabled, must be between 4-12 characters.
The Host can also be an Active 706, Pending 707, or Inactive 703 DJ. When the party is started the Host automatically becomes the first Active DJ 706, however the Host can manually drop their connection to the speaker, which would cause them to become a Pending DJ 707. If the Host loses Internet connection then they become an Inactive DJ 703.
The Host may optionally control the playback sequence by skipping a song that is currently being played. If the Host skips a track the next track begins playing almost immediately (e.g., within 2 seconds).
As an option the Host could demote a selected user presently participating as an Active DJ 706 to Guest 708 status, thus suspending that user's ability to contribute media selections to the Party playlist for playback over party speaker 110.
The Host may also End the party 510.

Figure 11A:
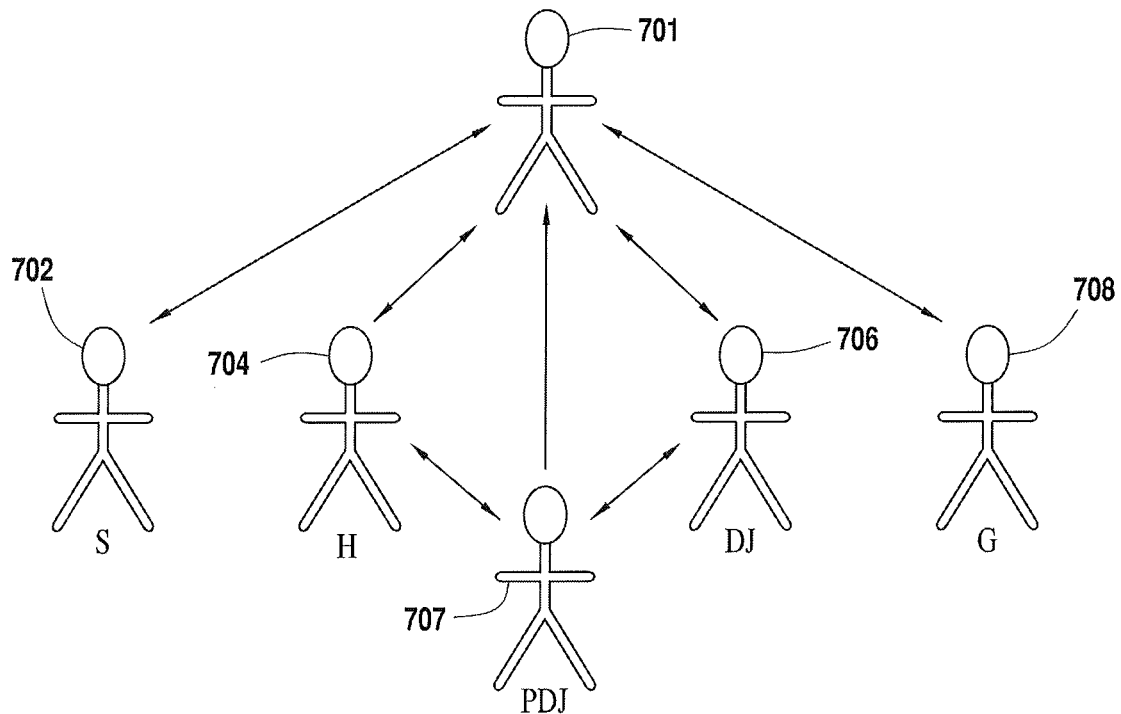
FIG. 11a-11c illustrates a system and method for providing media playback to a media playback device adapted to receive playback wirelessly through a plurality of portable electronic user devices via an integrated application connected to a server through the Internet by illustrating the relationships between the users and the roles they hold based on different actions, in accordance with the present invention.
Figure 11B:
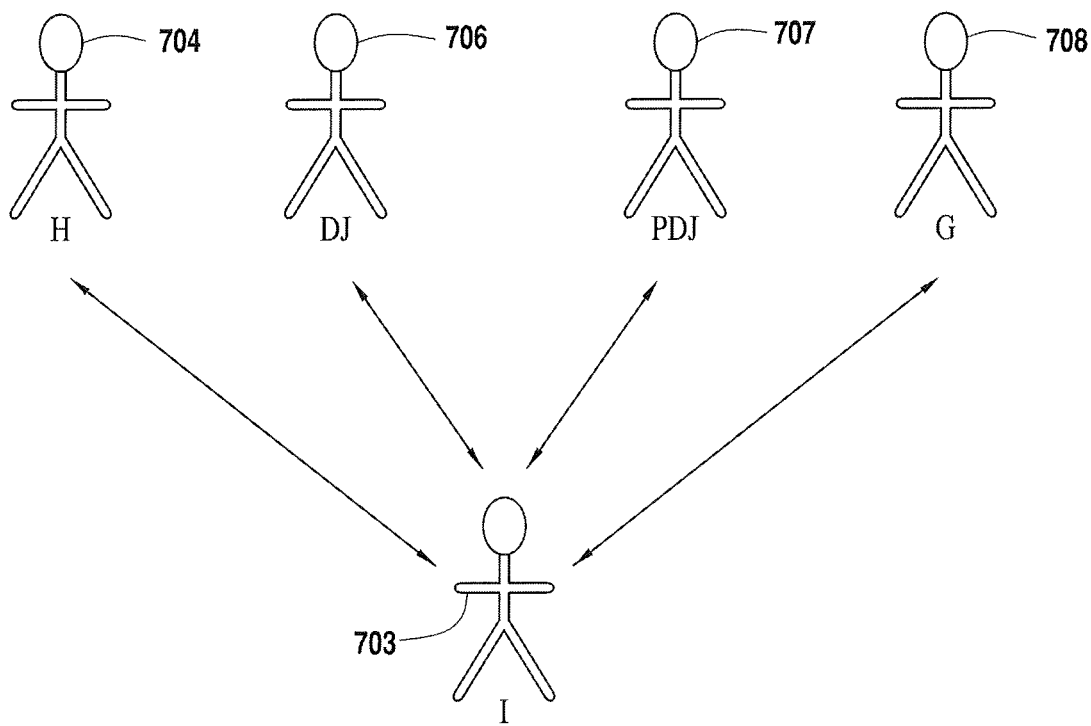
Figure 11C:
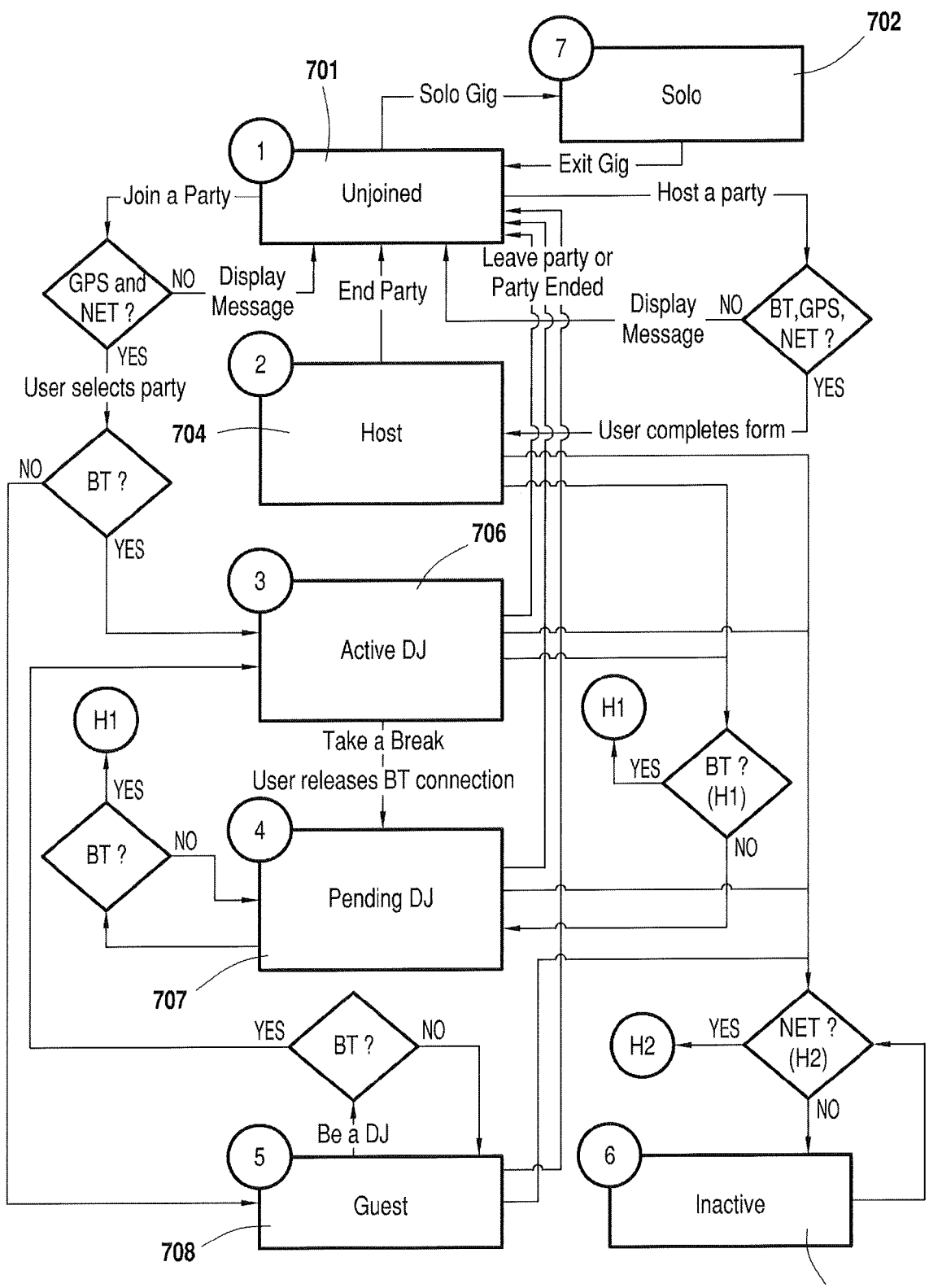

Turning now to the other users participating in an ongoing party event, there can be Active DJs 706, Pending DJs 707, or Inactive DJs 703 as shown in FIGS. 11a-11c. Inactive DJs 703 are Active and Pending DJs who have lost communications with the server. An Active DJ 706 is a user whose device 150 is connected to the speaker 110 and has joined the party.

Active DJs 706 can perform the following functions:
Add songs, albums, or playlists from their music library to their party playlist.
Delete songs, albums, or playlists from their party playlist.
Change the order of songs, albums, or playlists in their party playlist.
Play songs from their party playlist to the speaker (initiated by server and App).
Vote on the currently playing (or recently playing song). Voting 'Thumbs Up' or 'Thumbs Down' is an option.
View the list of DJs and the next songs in their party playlist.
Set their profile name. This is mandatory and can be changed during a party. Field is limited to 20 alphanumeric characters.
Set their profile photo (take with camera or choose from library). This is optional and can be changed during a party.

A Pending DJ 707 is a user person that need not have a connection between the user's device 150 and the party speaker 110. Pending DJs 707 can perform the following functions:
Add songs or playlists from their music library to their party playlist.
Delete songs, albums, or playlists from their own device's party playlist.
Change the order of songs, albums, or playlists in their party playlist.
Vote on the currently playing (or recently playing song). Voting 'Thumbs Up' or 'Thumbs Down' is an option.
View the list of DJs and the next songs in their party playlist.
Set their profile name. This is mandatory and can be changed during a party. Field is limited to 20 alphanumeric characters.
Set their profile photo (take with camera or choose from library). This is optional and can be changed during a party.

The fourth category of participating user is the Guest 708. A Guest 708 is a person that does not have a connection between his or her device 150 and the speaker 110 but has joined the party. Guests 708 can perform the following functions:
Vote on the currently playing (or recently playing song). Voting 'Thumbs Up' or 'Thumbs Down' is an option.
View the list of DJs and the next songs in their party playlist.
Set their profile name. This is mandatory and can be changed during a party. Field is limited to 20 alphanumeric characters.
Set their profile photo (take with camera or choose from library). This is optional and can be changed during a party.
Become a DJ.

The short-range wireless communications channel between each participating user streaming media content to the speaker 110 may be configured to provide Serial Port Protocol Messaging, and under certain circumstances a device 150 running the App and speaker 110 will communicate with one another using the serial port protocol. The Message ID field will preferably be 16-bits in length, and the message payload length field will also be 16-bits in length. If data needs to be sent as part of the message, the length is the size of the structure containing the data. Otherwise, the field must be set to zero. The payload contains the information of the message.

Supported Messages between each participating user streaming media content to the speaker 110 may include "Party On (0x0001)", a message informs the speaker (and iWrap™ Bluetooth firmware) that party mode has started. The message contains no other data. Successful acknowledgement from speaker 110 is "0x1101."

When the Host determines that the party will end, an encoded message for "Party Off" (0x0002) places speaker 110 in standby and informs the speaker's controller 116 that party mode has ended. The message contains no data. Successful acknowledgement is "0x1102."

When a new party is created, a message must be sent from the App on the Host 704 user's device 150 to the speaker 110 informing the speaker that party mode has been started. If the Host Device 150 is Running iOS (e.g., an IPhone), the App on the Host's device will play a short audio track indicating that the party is starting. The Title field of the audio track is preferably populated with 'PolkPartyOn'. Alternatively, the serial port protocol messaging could be employed as is done for Android devices.

The Host 704 must have already established a short-range wireless data streaming (e.g., Bluetooth) connection 105 to speaker 110 in order to initiate and Host a party event, and as noted above, the Host must provide a party name. While the Host may optionally require and provide a party password; the default is no password. When a prospective participating user or a user without a role 701 first launches the App on the user's device 150 the user will have the ability to 'Join a Party' 164 by communicating with the system's server 120. When selected, the App programming uses the device's location services and party status data from Server 120 to search for parties within that user's immediate location to join. Preferably, the user's device 150 will then display a list of parties including all parties within a selected distance (e.g., within a 2 mile radius).

When the user selects by tapping on a party from the list view they immediately join the party. Optionally, the user can be presented with a dialog box showing the party information along with 'Cancel' and 'Join' buttons. If the Host has enabled password protection then a password text field is also displayed.

When the Host ends the party, a message must be sent from the App on the Host's device 150 to the speaker 110 informing the speaker 110 that party mode has been ended. If the Host device is running Apple's iOS, the App on the Host's device 150 will preferably shall play a short audio track indicating that the party is ending. Preferably, the Title field of the audio track will be populated with 'PolkPartyOff'.

As noted above, an important part of the party event is the participation of users in evaluating and reporting preference information about selected media content or music which is streamed and played for listeners, this part of the method of using system 100 is called "Voting." One option for voting is that any user type can vote 'Thumbs Up' or 'Thumbs Down' on songs. Preferably, users cannot vote on their own song. Hosts 704, Active DJs 706, Pending DJs 707, and Guests 708 can all vote. Voting for a given song is available once a song has started and ends after the next song has finished, and users may change their vote on a song during that time period.

Voting information is reported to and accumulated in server 120 and participating users who stream music ("DJs") can earn points. The maximum number of DJ Points a DJ can earn for a song depends on the total number of votes cast for that song and can change during the voting timing. For example, the Targets selected for received votes can be automatically adjusted in System 100 as follows:

1-10 votes: Target=100
11-25 votes: Target=200
26-40 votes: Target=300
41-60 votes: Target=400
61+ votes: Target=500

Example 1: There are 10 Up votes and 5 Down votes, giving a total of 15 votes. The Target is set at 200 points.

Example 2: There are 35 Up votes and 11 Down votes, giving a total of 46 votes. The Target is set at 400 points.

The number of "DJ Points" that a DJ earns for a song is the percentage of Up votes (against the total) times the Target.

Example 3: There are 10 Up votes and 5 Down votes, giving a total of 15 votes. The Target is set at 200 points. The DJ Points earned is (10/15)*200=133.

Example 4: There are 35 Up votes and 11 Down votes, giving a total of 46 votes. The Target is set at 400 points. The DJ Points earned is (35/46)*400=304.

This is just one option for how points can be awarded.

Each participating user can monitor the voting results by observing a Point Display on his or her device 150. Preferably, a meter type display will be used to graphically show the level of points earned for a given song. The display will have a maximum value equal to the Target, which may change during the course of voting. When the Target changes it should be apparent to the user. The meter level will indicate the current number of points for that song and shall update when a vote is made or changed. Preferably, a DJ's cumulative points will be shown in the DJ List view.

Each participating user can enjoy the streamed music listening experience while viewing his or her device's "Now Playing" screen, which provides the main screen a user sees when joined to a party. The 'Now Playing' screen preferably includes the following features:

Album art is displayed. Album art is preferably updated on every user's display 157 within 1 second of the start of a song.

Artist name and track name is displayed, and is also updated within 1 second of the start of a song.

Each user also sees 'Thumbs Up' and 'Thumbs Down' buttons; and if the user makes a selection, the selected button is highlighted. Preferably, each user's device communicates periodically with server 120 and outside rings around the 'Thumbs Up' and 'Thumbs Down' symbols indicate the percentage of users with that vote type. The ring is preferably red for down votes and green for up votes. User points earned for that song are preferably indicated and adjusted in real time. This is just one option for voting.

A Photo of the DJ that selected the 'Now Playing' song is also displayed and if the user elects to Tap that DJs photo, the App takes the user to that DJ's profile page.

In a preferred embodiment, a participating user has access to added options including an optional DJ List menu, and when the user taps on or selects the menu using touchpad sensor 157, the user sees a DJ List page. A "My Playlist" menu option is also provided where tapping on the menu option brings the user to the My Playlist page. An add Music menu option is selected by tapping on the menu using touchpad sensor 157, which brings the user to the Add Music page. A Last Song menu option is enabled by tapping on the button using touchpad sensor 157 which brings the user to the Now Playing' screen of the prior song for vote casting purposes.

The Host has added options, for example, a Party Settings menu option (Host view only) is enabled by tapping on the button using touchpad sensor 157 which brings up the Party Settings page where the Host can change the party name and enable/disable password protection.

A number of controls are displayed as software "buttons" which are displayed by the App and available to all participating users using device touchpad sensor 157. For example, Last Song shows the information for the last song played for late voting, and DJ List shows a list of current Active 706, Pending 707, and Inactive 703 DJs. A button called Your Playlist shows your song queue. And a button called Leave allows the user to leave the party. A button called Your Profile allows the user to create or edit their user profile, and a button called Help retrieves Help information from Server 120.

A number of controls are displayed as software "buttons" which are displayed by the App and available to the Host using device touchpad sensor 157. For example, a button called End Party allows the Host to end the party 510, and a button called Party Settings allows the Host to change the party name or change or set a password 508.

Returning to the DJ List View feature, the order of DJs is selectable and preferably Active DJs 706 are displayed first, in order of play sequence (currently playing on top); the DJ with the currently playing song will have a first unique background color, and the remaining Active DJs 706 will have a second unique background color. Pending DJs 707 are displayed last and will have a third unique background color.

The method for managing the resources of system 100 anticipate unusual or Fringe situations. For example, if Speaker 110 goes into sleep mode due to inactivity, the party is suspended and the party playlist cued for streaming is saved in the server memory for later use. If a blackout happens or Speaker power is cycled, the party may be suspended and the party playlist cued for streaming is saved in the server memory for later use.

Additional Considerations:
1. Regarding selection of music to be played:
   a. Active or Pending DJs can select songs stored on their local device 150 to add to their Playlist (Active DJs songs will play when their turn occurs; Pending DJs songs will not play until they become active)
   b. The control for who will be the next Active DJ to stream music is determined by alternating between the DJs on the Active DJ list. One song from an Active DJ is played before the next Active DJ is given a turn. This continues until there are no more DJs in the Active DJ list with songs in their playlist.
   c. Optionally, Active or Pending DJs can select songs stored on their cloud-based music library to add to their Playlist (Active DJs songs will play when their turn occurs; Pending DJs songs will not play until they become active).
   d. Alternatively, Active or Pending DJs can select songs stored on a 3rd-party music service to add to their Playlist (Active DJs songs will play when their turn occurs; Pending DJs songs will not play until they become active).
   e. Another options is that All users can view the local music libraries of Active or Pending DJs and make song requests—accepted requests will cause that song to be added to the playlist of the song owner.
2. Regarding information transferred between devices 150 (e.g., phones, tablets) and the server 120:
   a. The server 120 stores Party Information such as Party Name, Party Password (if any), Host Name, Party Location, Speaker 110's MAC Address.
   b. The server 120 stores DJ Information such as Profile Name, Profile Photo, Profile Bio, Points Earned, Bluetooth Connection Info (connected or disconnected)
   c. The server 120 stores Song Information such as Title, Artist, Album Name, Album Art
   d. Each device 150 running the App will periodically poll the server 120 to get updates
3. Regarding App control of device's short range Wireless (e.g., Bluetooth) connection status:
   a. Programmatic control (no user intervention) of a device's Bluetooth connection status (i.e. the ability to disconnect and connect completely from within the App) cannot be done for iOS by the device. It can be done for Android.
   b. For iOS, the applicants have successfully embedded commands to the speaker 110 in the metadata of a faux song to be streamed as a wireless signal; if the Bluetooth module is signed up to receive "track change notifications" then it can issue an AVRCP request for the metadata once the faux song is started. It would then receive the metadata and can parse out the command. Alternatively, the serial port protocol messaging could be employed as is done for Android devices.
4. Regarding Hosts, DJs, and Guests
   a. As noted above, the Host 704 is the event-establishing user who sets up the party.
      i. To set up the party (and become the Host 704) the user's device 150 must have location services 156 enabled, an Internet connection 152, and a Bluetooth connection 154 communicating with a selected party speaker 110.
      ii. To continue to perform Host functions once the party has been set up, the Host user's device 150 must have an Internet connection; note that the Host could also be an Active DJ 706 (in which case they need a wireless/Bluetooth connection), or a Pending DJ 707.
   b. In the current App version, for anyone to join the party they must have location services enabled. Note that we could easily require party names to be unique, require passwords, and then allow someone to type in the name & password. They could then join the party without location services enabled.
   c. To join the party as an Active DJ 706, the user's device must have a wireless/Bluetooth connection to the speaker 110.
   d. To be participating in the party at all the user's device 150 must have an Internet connection. Otherwise they cannot communicate with the server 120.
5. Our App roadmap consists of:
   a. Chat function between users,
   b. Social Media (e.g., Facebook®/Twitter®) integrations,
   c. User accounts—points, playlists, etc. can be saved from party to party,
   d. Cash in points for things like moving a given user's songs up in the playlist results, or merchandise from the system administrator (e.g., Polk Audio merchandise).
   e. Selecting songs from a user's cloud-based library; selecting songs from a 3rd-party music service,
   f. Games & trivia integration,
6. Mobile platforms supported,
   a. iOS, Android, and optionally Windows mobile, and
   b. iOS, Android, and optionally Windows tablet.
7. One of the communications (aside from the standard Bluetooth transmission) that occurs between the devices (phones) 150 and the speaker 110 is at the beginning and end of a party. This is when we play a faux song to tell the speaker to enter/exit party mode. There are other commands/communications that we send between the device and the speaker.

8. The wireless (e.g., Bluetooth) stack firmware (iWrap) has been customized to support party mode as follows:
   a. iWrap now has a party mode register (location in memory) that defines whether the speaker 110 is in party mode or not,
   b. When the party mode register is TRUE,
   c. Up to four (4) user devices 150 can connect to the speaker 110 (otherwise, in Normal mode, only one device can connect),
   d. Incoming audio requests that occur when audio is already playing on speaker 110 will be ignored (this allows the App to be in complete control of which device 150 is playing audio),
   e. AVRCP commands from the speaker MCU (for example to pause, play, or change tracks) are ignored, and
   f. PLAY commands (to generate audio tones for when devices are connected/disconnected) from the speaker MCU are also ignored.

Turning now to a more specific description of the method of the present invention, referring to FIGS. 1, 5, 6 and 7, the present invention provides a method for providing media playback to a media playback device 110 adapted to receive playback wirelessly through a plurality of portable electronic user devices 150 via an integrated application connected to a server 120 through the Internet 130 and includes: determining whether a prospective event initiating user is in within listening proximity to a short range wireless media playback device 110 adapted to receive playback wirelessly from a portable electronic user device 150 and play media or music for listeners in a first listening space, and if so, inviting said prospective event-initiating user via a home screen of said integrated application (see FIG. 3) to either establish and Host a new media listening party event in the first listening space or join an existing media listening party event in a second listening space. That selection is a selection enabling a Host to establish and manage a party 300.

Figure 8:
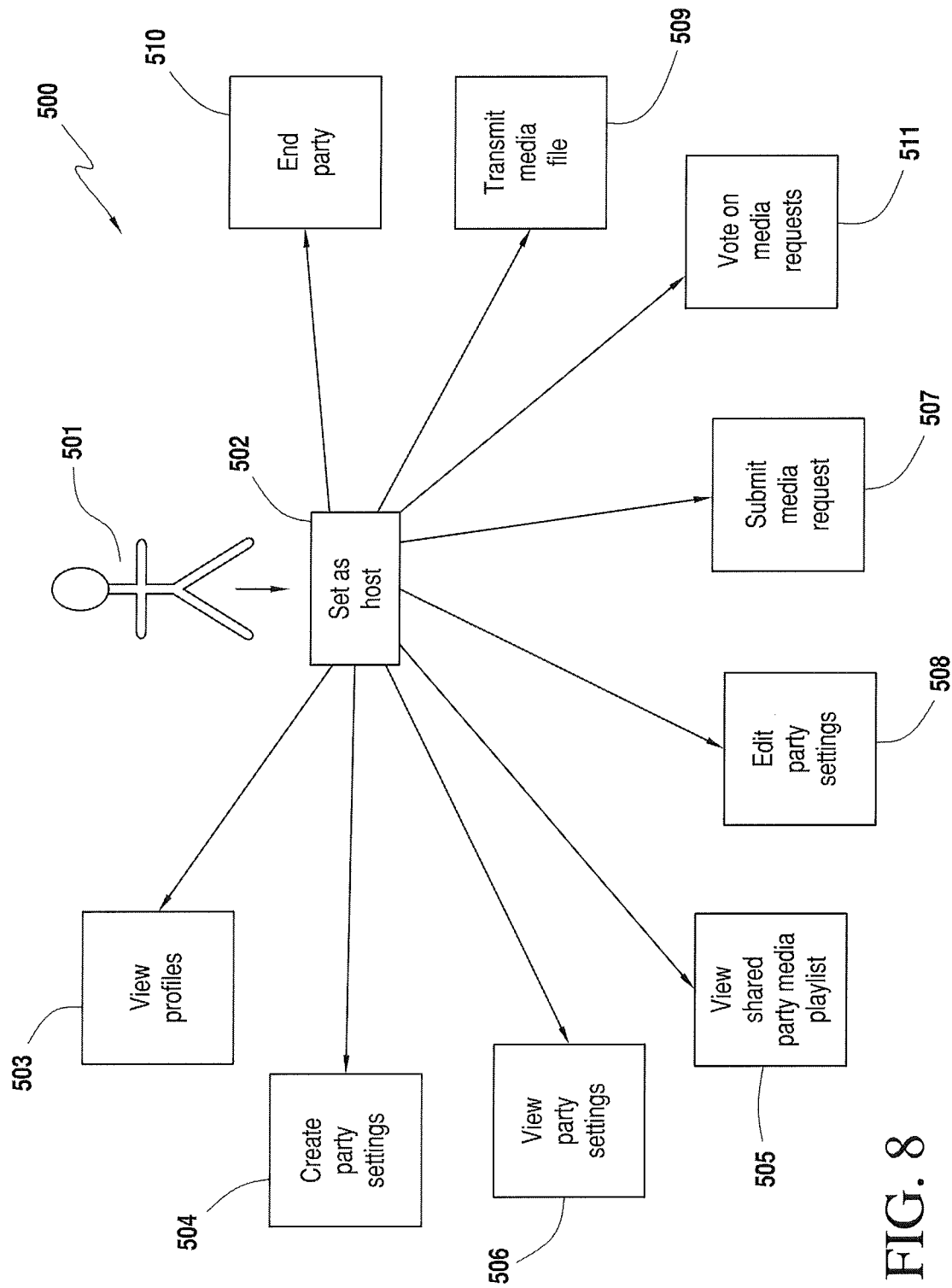
FIG. 8 illustrates a system and method for providing media playback to a media playback device adapted to receive playback wirelessly through a plurality of portable electronic user devices via an integrated application connected to a server through the Internet by illustrating the role of a user as a Host and the capabilities a Host maintains, in accordance with the present invention.

As shown in FIGS. 5, 6 and 8, the Host selections for managing the party include: giving the Host a role as a Host; creating settings for a party 302; viewing said party settings; editing said party settings; and ending said party.

Figure 9:
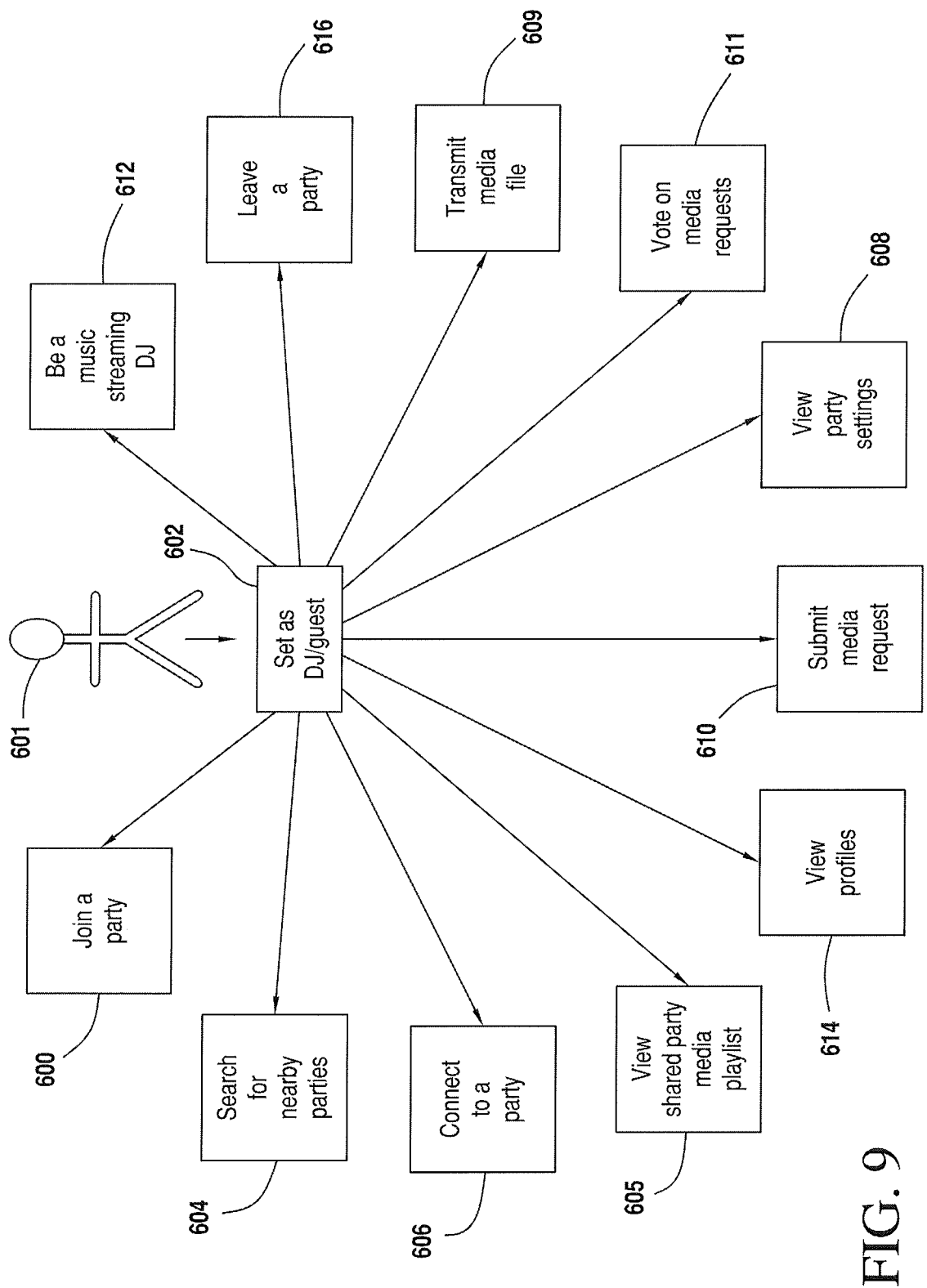
FIG. 9 illustrates a system and method for providing media playback to a media playback device adapted to receive playback wirelessly through a plurality of portable electronic user devices via an integrated application connected to a server through the Internet by illustrating the role of a user as a DJ or Guest and the capabilities a DJ or Guest maintains, in accordance with the present invention.

The media playback method as shown in FIGS. 7 and 9 includes "join a party" 400, which further comprises: searching for at least one party by location (405, 604); selecting a party to join; and joining the user-selected party (416, 606). The user then selects an option view party settings 608, search and select songs 610, be a music streaming DJ 612, view user profile 614, or leave party 616.

The media playback method may be characterized as receiving a prospective event-initiating user's instruction to establish and Host a media playback event in a first listening space; and establishing a media streaming connection between said prospective event-initiating user's portable electronic device and said media playback device.

FIG. 8 illustrates a Host user's capabilities 500, where an unjoined user or user without a role 501 is assigned the role of Host 502 can do including: view profiles 503, create party settings 504, view shared party media playlist 505, view party settings 506, submit media request 507, edit party settings 508, transmit media file 509, and end party 510.

FIG. 9 illustrates a DJ/Guest user's capabilities 600, where unjoined user or user without a role 601 is assigned the role of a DJ or Guest 602 can do including: search for parties 604, join a party 600, connect to a party 606, view shared party media playlist 605, view party settings 608, search and select songs or submit media request 610, transmit media file 609, vote on media request 611, be a music streaming DJ 612, view user profile 614, or leave a party 616.

Figure 10:
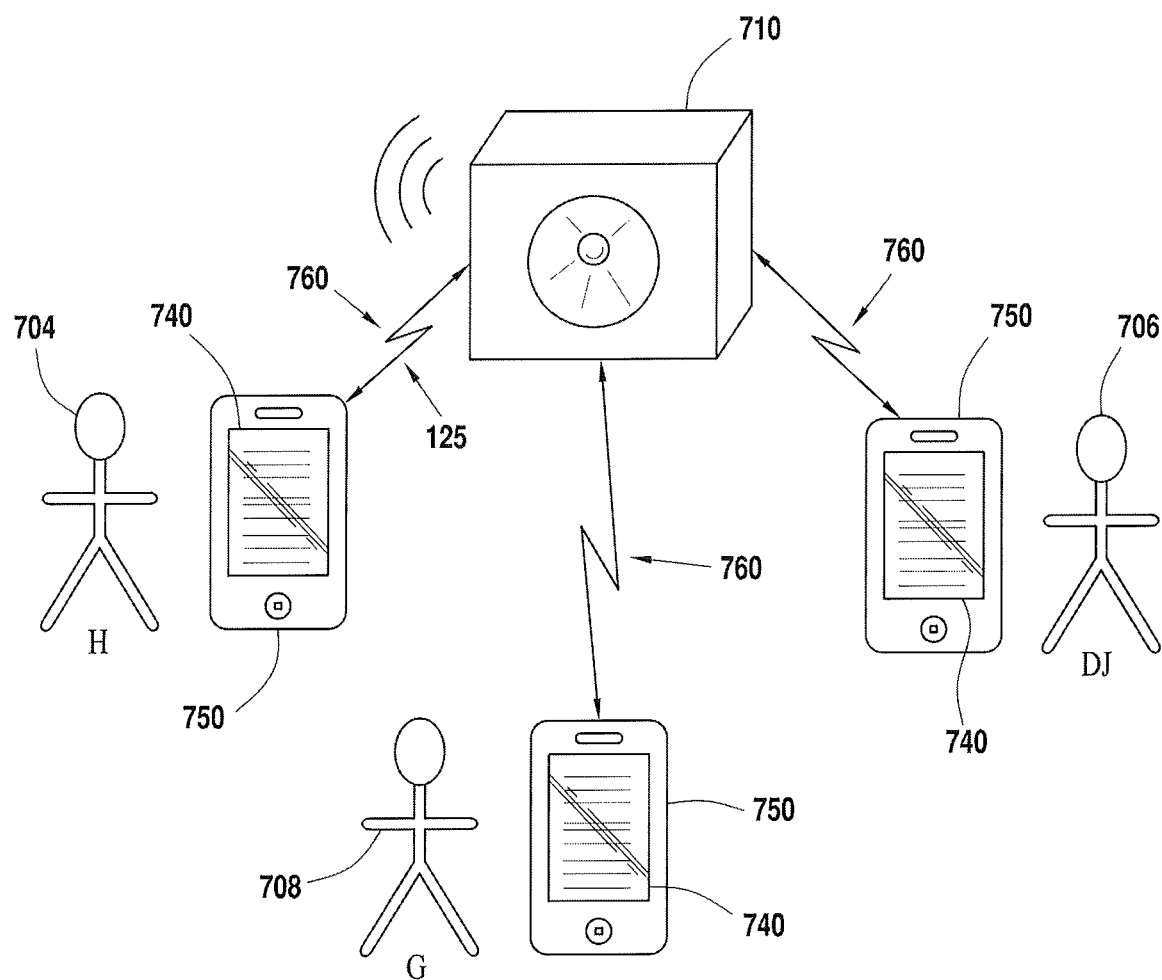
FIG. 10 illustrates a system and method for providing media playback to a media playback device adapted to receive playback wirelessly via Bluetooth™ through a plurality of portable electronic user devices via an integrated application connected to a server through the Internet, in accordance with the present invention.

FIG. 10 illustrates an embodiment of the multi-user wireless media (e.g., music) playback system which is configured for use with a transportable, wireless media playback component (e.g., loudspeaker) 710 and at least one server which is preferably connectable to a plurality of personal electronic devices such as smartphones 750 for users (i.e. 704, 706, 708) via the Internet 730. Where the plurality of personal electronic devices such as smartphones 750 are connected wirelessly to the wireless media playback component 710 via Bluetooth 760.

FIG. 11*a*-11*c* illustrate the relationships between the users and the roles they hold based on different actions, in accordance with the present invention.

An unjoined user or a user without a role 701 may be assigned one of four roles, Solo 702, Host 704, Active DJ 706, or Guest 708. A user that is a Host 704 or Active DJ 706 can become a Pending DJ 707 if they lose their Bluetooth connection or take a break. When a Pending DJ 707 regains their Bluetooth connection they return to their previous state, either as Host 704 or Active DJ 706. A Guest can become an Active DJ 706 having a Bluetooth connection and requesting to "Be a DJ."

A solo user 702, a Host 704, an Active DJ 706, a Pending DJ 707, and Guest 708 can become an unjoined user or user without a role 701 by leaving a party or in the case of a Host 704, ending the party 510.

A solo user 702, a Host 704, an Active DJ 706, a Pending DJ 707, and Guest 708 can become an Inactive user 703 when the Internet connection is lost. When the Internet connection is reestablished, the Inactive user 703 returns to the previous user role it held before the loss.

The users in the system and method have seven main states, indicated by the boxes.
1. Unjoined 701 (S1)
2. Host 704 (S2)
3. Active DJ 706 (S3)
4. Pending DJ 707 (S4)
5. Guest 708 (S5)
6. Inactive 703 (S6)
7. Solo 702 (S7)

Movement from one state to another can be by user action or by connection status of GPS, Bluetooth (BT), and Internet (NET).

History mechanisms (H1 and H2) are used in the diagram to show that the App returns to its previous state. H1 returns to S2 or S3 from S4. H2 returns to S2, S3, or S4 from S6.

Hosting a Party

A user can Host a party from the Unjoined 701 (S1) state by tapping on the "Host a Party" button. If the device has a BT, GPS, and NET connection the App enters the Host 704 (S2) state after user submits form. If the device does not have a BT, GPS, and NET connection a message is displayed and the App stays in the Unjoined 701 S1 state.

Joining a Party

A user can join a party from the Unjoined 701 (S1) state by tapping on the "Join a Party" 164 button. If the device does not have a GPS or NET connection, a message is displayed and the App stays in the Unjoined 701 S1 state. If the device has a GPS and NET connection, a check on BT connection is made. If there is a BT connection, the App enters the Active DJ 706 (S3) state. If there is not a BT connection, the App enters the Guest 708 (S5) state.

Ending a Party

If the App is in the Host 704 state (only one user in the party can be the Host), the user can end the party by selecting the "End Party" option from the menu. The App then returns to the Unjoined 701 (S1) state. Any other users in the same party will also automatically return to the Unjoined 701 (S1) state.

Leaving a Party

Users in the Active DJ 706 (S3), Pending 707 DJ (S4), or Guest 708 (S5) state can return to the Unjoined 701 (S1) state by selecting the "Leave Party" option from the menu. This action does not affect any other users.

Loss of BT Connection

If a user loses their Bluetooth connection when in the Host 704 (S2) or Active DJ 706 (S3) state, then the App automatically goes into the Pending DJ 707 (S4) state. If their Bluetooth connection is subsequently restored, then the App automatically returns to their previous state Host 704 (S2) or Active DJ 706 (S3) as indicated by the history mechanism (H1).

Loss of Network Connection

If a user loses their Network connection when in the Host 704 (S2), Active DJ 706 (S3), Pending DJ 707 (S4), or Guest 708 (S5) state, then the App automatically goes into the Inactive 703 (S6) state. If their Network connection is subsequently restored, then the App automatically returns to their previous state (Host 704 (S2), Active DJ 706 (S3), Pending DJ 707 (S4), or Guest 708 (S5)) as indicated by the history mechanism (H2).

Become a DJ

When in the Guest 708 (S5) state, the user can move the App to the Active DJ 706 (S3) state by tapping on the "Be a DJ" button. This change of state will only occur if the user has a Bluetooth connection.

Take a Break

When in the Active DJ 706 (S3) state, the user can move the App to the Pending DJ 707 (S4) state by tapping on the "Take a Break" button. The user will need to manually release the Bluetooth connection for this action to take effect.

Solo Gig

The user can cause the App to enter the Solo 702 (S7) state by tapping on the "Solo Gig" button while in the Unjoined 701 (S1) state. The user can cause the App to return to the Unjoined 701 (S1) state by tapping on the "Exit Gig" menu item.

Figure 12:
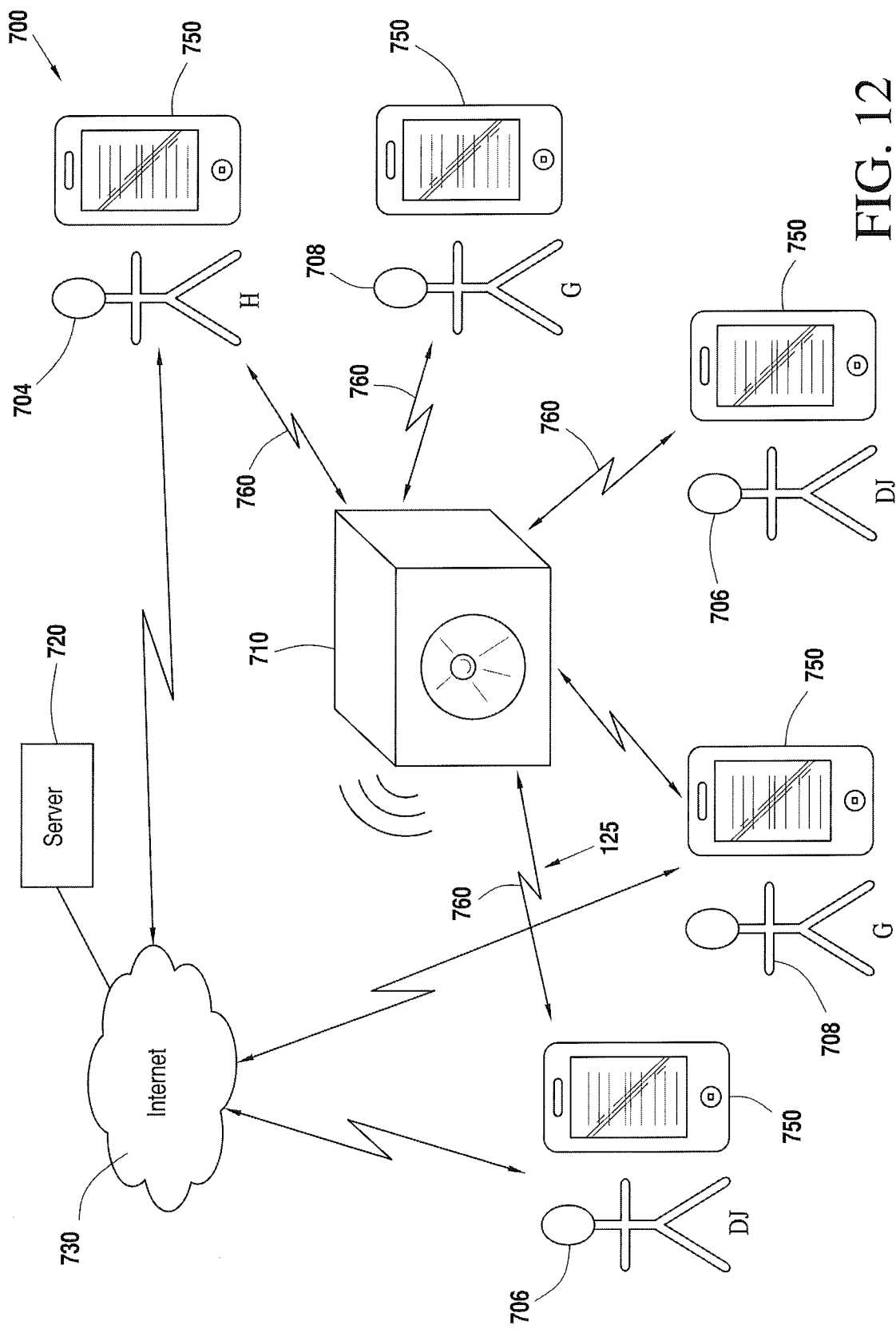
FIG. 12 illustrates a system and method for providing media playback to a media playback device adapted to receive playback wirelessly through a plurality of portable electronic user devices via an integrated application connected to a server through the Internet, in accordance with the present invention.

FIG. 12 illustrates an embodiment of the multi-user wireless media (e.g., music) playback system 700 which is configured for use with a transportable, wireless media playback component (e.g., loudspeaker) 710 and at least one server 720 which is preferably connectable to a plurality of personal electronic devices such as smartphones 750 for users (i.e. 704, 706, 708) via the Internet 730. Media data signals 125 are transmitted and received between wireless loudspeaker 710 and personal electronic device 750 over wireless signal 760.

FIG. 13 illustrates a queue 862 within the controller (116, 860) which stores the media request signals 864 sent by at least one portable electronic user device (150, 850). The media request signals 864 are held in the queue 862 in a first in, first out order. When a media request signal 864 reaches the top of the queue, the controller makes a request to the requesting portable electronic user device (150, 850) to send the respective media playback file 870.

The controller (116, 860) will not immediately cut off media playback, but will wait until completion of the media playback unless a direct request to stop playback is received from a Host 704 whereupon the next media request signal 864 in the queue 862 is played.

FIG. 14 illustrates the storage of media playback files 870 on a portable electronic user device. A Solo 702, Host 704, or Active DJ 706 can send media request signals 864 for a given media playback file 870 to the controller (116, 860) for playback. The controller (116, 860) will place the media request signal 864 in its queue 862. The queue is the shared Party Mode playlist.

FIG. 15 illustrates the Party Mode Network 840, which comprises a Party Mode server 820 and at least one portable electronic user device 850. The portable electronic user devices 850 are connected to the Party Mode server via the Internet 830.

Figure 16:
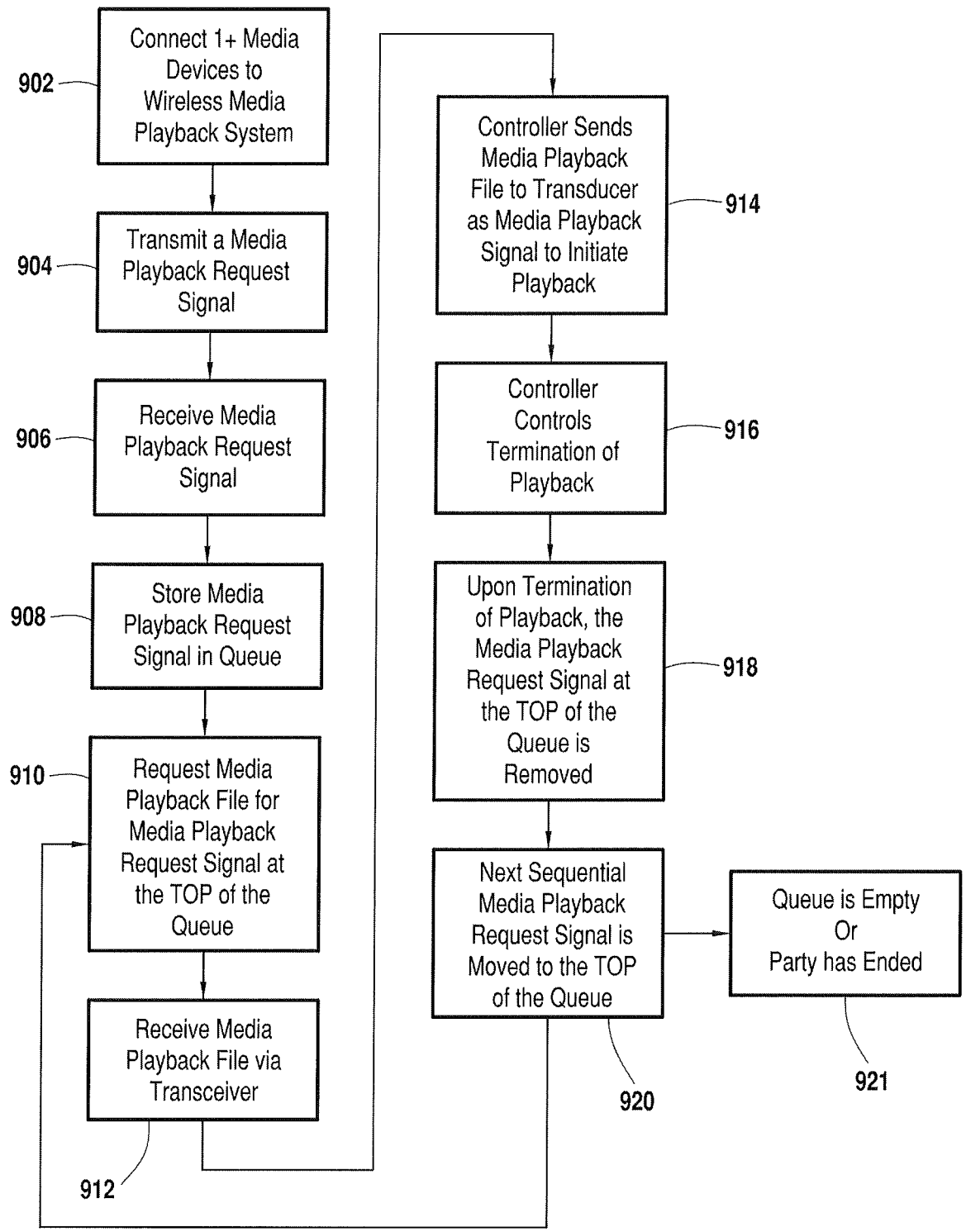
FIG. 16 illustrates a system and method for providing media playback to a media playback device adapted to receive playback wirelessly through a plurality of portable electronic user devices via an integrated application connected to a server through the Internet, in accordance with the present invention.

FIG. 16 illustrates how the media playback of the shared Party Mode playlist occurs. One or more portable electronic user devices 850 are connected to the wireless media playback system 902 wirelessly. The portable electronic user devices 850 transmit media playback request signals 864 to the wireless media playback system 904 which are received by the transceiver 906 and passed onto the controller 860. The controller 860 stores the media playback request signals 864 in a queue 862 sequentially 908. The controller 860 takes the media request signal 864 at the top of the queue 862 and sends a request to its respective portable electronic user device 850 for its respective media playback file 870 via the transceiver 910. The media playback file is received by the transceiver 912 and the controller sends the media playback file to the transducer as a media playback signal to initiate playback 914. Playback of the media playback file 870 continues until the controller 860 sends a termination signal 916 either upon completion of the media playback file 870 or upon a direct request to stop playback from the Host 704. Upon termination of playback, the media playback request signal 864 at the top of the queue is removed 918 and the next sequential media playback request signal 864 is moved to the top of the queue 920. The process of requesting the media playback file 870 of the respective media request signal 864 at the top of the queue 862 to removing the media playback request signal 864 from the top of the queue 862 continues until either the queue 862 is empty or the party has ended 921.

The Party mode algorithm communicates with the controller 860 of the wireless media playback system via the transceiver of the wireless media playback system using control signals to send media playback request signals 864. The algorithm sends the respective media playback file 870 in response to a request from the controller 860. The algorithm also communicates with the Party Mode server 820 to send data (i.e. geographic location and statistics, profile information, votes etc.) and requests (i.e. searches for nearby Parties, requests to view another user's profile, etc.).

A method for providing media playback to a media playback device adapted to receive playback wirelessly through a plurality of portable electronic user devices via an integrated application connected to a server through the Internet comprising:

a) determining whether a prospective event initiating user 701 is within listening proximity to a first short range wireless media playback device 710 adapted to receive playback wirelessly from a portable electronic user device 750 and play media or music for at least one listener in a first listening space, and if so, b) inviting the prospective event-initiating user via a home screen of the integrated application 740 to make a selection.

Where the selection is a selection enabling a Host to establish and manage a party 500 or join a party 600 which is within a selected geographic proximity, radius or range to the prospective event-initiating user 701. Where wirelessly means a Bluetooth connection (105,760). Where Host selections for managing the party further comprise:

a) giving the user a user role as a Host 502;

b) creating settings for a party 504;

c) viewing the party settings 506;
d) editing the party settings 508;
e) ending the party 510.

Where to join a party further comprises:
a) searching for at least one party by location 604;
b) selecting a party to join;
c) joining the party 606;
d) giving the user a user role as a Guest 708, a DJ 706.
e) selecting an option from the user to view party settings 608, search and select songs 610, be a music streaming DJ 612, or view user profile 614.
f) receiving the option from the user.

A method for providing media playback to a media playback device 710 adapted to receive playback wirelessly through a plurality of portable electronic user devices 750 via an integrated application 740 connected to a server 720 through the Internet 730 comprising:
a) determining whether a prospective event initiating user 701 is within listening proximity to a first short range wireless media playback device 710 adapted to receive playback wirelessly from a portable electronic user device 750 and play media or music for at least one listener in a first listening space, and if so,
b) inviting the prospective event-initiating user 701 via a home screen of the integrated application 740 to make a selection;
c) receiving the prospective event-initiating user's instruction to establish and Host a media playback event in the first listening space 300; and
d) establishing a media streaming connection between the prospective event-initiating user's portable electronic device 750 and the media playback device 710.

A method for providing media playback to a media playback device 710 adapted to receive playback wirelessly through a plurality of portable electronic user devices 750 via an integrated application 740 connected to a server 720 through the Internet 730 comprising:
a) determining whether a user is in close proximity to a media playback device adapted to receive playback wirelessly;
b) inviting an event-initiating user 701 via the integrated application 740 to Host a party 300 or join a party 400;
c) receiving a selection from the event-initiating user, where the selection is to Host a party 300;
d) asking the event-initiating user if they have viewed a Host tutorial and if not displaying the Host tutorial 306;
e) determining if event-initiating user is connected to Bluetooth, a wireless network, and GPS 308 and if not display an alert 309 before returning them to the home screen.
f) determining if event-initiating user has a user profile 310 and if not creating a user profile 312;
g) establishing party event settings 314 including party event name and a password if desired; and
h) displaying a Now Playing screen 316.

A method for providing media playback to a media playback device 710 adapted to receive playback wirelessly through a plurality of portable electronic user devices 750 via an integrated application 740 connected to a server 720 through the Internet 730 comprising:
a) determining whether a user is in close proximity to a media playback device adapted to receive playback wirelessly;
b) inviting an event-initiating user via the integrated application to Host a party or join a party 200;
c) receiving a selection from the event-initiating user, wherein the selection is to join a party 400;
d) determining if event-initiating user is connected to a wireless network and GPS 402 and, if not, display an alert 403 before returning to the home screen.
e) loading a list of party events in close proximity to the user 405 and if no party events are found then the user may retry or cancel before returning to the home screen 406;
f) selecting a party event from the list of party events 408;
g) determining if the party event is password protected 410;
h) entering a password if the party event is password protected 412 and if the password is incorrect 414 then the user may retry or cancel before returning to the home screen;
i) joining the party event 416.

A multi-user wireless media playback system, comprising:
a wireless transceiver 710 configured to receive streaming media playback signals from a selected plurality of portable electronic user devices 750 which are also connected to and responsive to a system including a server 720 having multi-user listening party management software,
a controller programmed to control which streaming media playback signal from the selected plurality of portable electronic user devices is selected for playback.

A wireless loudspeaker 710 configured to playback music from a plurality of users and a system programmed to manage multi-user wireless media playback over the loudspeaker, comprising:
a wireless transceiver 710 configured to receive streaming media playback signals from a selected plurality of portable electronic user devices 750 which are also connected to and responsive to a system including a server 720 having multi-user listening party management software,
a controller programmed to control which streaming media playback signal from the selected plurality of portable electronic user devices is selected for playback.

A method for providing media playback to a media playback device 110 adapted to receive playback wirelessly through a plurality of portable electronic user devices 150 via an integrated application connected to a server 120 through the Internet comprises:
a) determining whether a user is in close enough proximity to a media playback device 110 adapted to receive playback wirelessly;
b) inviting an event-initiating user via the integrated application to Host a party or join a media listening party event in the listening space 200;
c) receiving a selection from the event-initiating user, where the selection is to Host a party 300;
d) asking the event-initiating user if they have viewed a Host tutorial 304 and if not displaying the Host tutorial 306;
e) determining if event-initiating user is connected to Bluetooth, a wireless network, and GPS 308 and if not display an alert 309 before returning them to the home screen.
f) determining if event-initiating user has a user profile 310 and if not creating a user profile 312;
g) establishing party event settings including party event name and a password if desired 314; and
h) displaying a Now Playing screen 316.

The figures also illustrate the method for providing media playback to a media playback device 110 adapted to receive playback wirelessly through a plurality of portable electronic user devices 150 via an integrated application connected to a server 120 through the Internet comprising:

a) determining whether a user is in close proximity to a media playback device 110 adapted to receive playback wirelessly;
b) inviting an event-initiating user via the integrated application to Host a party or join a party 200;
c) receiving a selection from the event-initiating user, where the selection is to join a party 400;
d) determining if event-initiating user is connected to a wireless network and GPS 402 and if not display an alert 403 before returning to the home screen.
e) loading a list of party events in close proximity to the user 405 and finding local parties 404, and if no party events are found then user may retry or cancel 406 before returning to the home screen;
f) selecting a party event 408 from the list of party events;
g) determining if the party event is password protected 410;
h) entering a password if the party event is password protected 412 and if the password is incorrect then user may retry or cancel 414 before returning to the home screen;
i) joining the party event 416.

A system for providing media playback to a media playback device 710 adapted to receive playback wirelessly 762 through a plurality of portable electronic user devices 750 via an integrated application 740 connected to a server 720 through the Internet 730 comprising: a) a plurality of prospective event-initiating users (704, 706, 708), where one user is a Host (704); b) a plurality of portable electronic user devices 750 where the devices have party mode listening software 740; c) a server with multi-user listening party management software 720; e) a wireless transceiver 710 configured to receive streaming media playback signals from a selected plurality of the portable electronic user devices 750 also connected to and response to the server and where the transceiver 710 has a controller programmed to control which streaming media playback signal from the selected plurality of portable electronic user devices 750 is selected for playback.

A system for providing media playback to a media playback device 710 adapted to receive playback wirelessly (105, 760) through a plurality of portable electronic user devices 750 via an integrated application 740 connected to a server 720 through the Internet 730 comprising: a) a plurality of prospective event-initiating users (704, 706, 708), where one user is a Host (704); b) a plurality of portable electronic user devices 750 where the devices have party mode listening software 740; c) a server with multi-user listening party management software 720; e) a wireless transceiver 710 configured to receive streaming media playback signals from a selected plurality of the portable electronic user devices 750 also connected to and response to the server and where the transceiver 710 has a controller programmed to control which streaming media playback signal from the selected plurality of portable electronic user devices 750 is selected for playback, where the wireless transceiver 710 is a wireless loudspeaker.

A system for providing media playback to a media playback device 710 adapted to receive playback wirelessly (105, 760) through a plurality of portable electronic user devices 750 via an integrated application 740 connected to a server 720 through the Internet 730 comprising: a) a plurality of prospective event-initiating users (704, 706, 708), where one user is a Host (704); b) a plurality of portable electronic user devices 750 where the devices have party mode listening software 740; c) a server with multi-user listening party management software 720; e) a wireless transceiver 710 configured to receive streaming media playback signals from a selected plurality of the portable electronic user devices 750 also connected to and response to the server and where the transceiver 710 has a controller programmed to control which streaming media playback signal from the selected plurality of portable electronic user devices 750 is selected for playback, where the users are either a Host 704, Guest 708, or DJ 706.

A system for providing media playback to a media playback device 710 adapted to receive playback wirelessly (105, 760) through a plurality of portable electronic user devices 750 via an integrated application 740 connected to a server 720 through the Internet 730 comprising: a) a plurality of prospective event-initiating users (704, 706, 708), where one user is a Host (704); b) a plurality of portable electronic user devices 750 where the devices have party mode listening software 740; c) a server with multi-user listening party management software 720; e) a wireless transceiver 710 configured to receive streaming media playback signals from a selected plurality of the portable electronic user devices 750 also connected to and response to the server and where the transceiver 710 has a controller programmed to control which streaming media playback signal from the selected plurality of portable electronic user devices 750 is selected for playback, wirelessly means a Bluetooth connection (105,760).

A method for providing media playback to a media playback device 710 adapted to receive playback wirelessly through a plurality of portable electronic user devices 750 via an integrated application 740 connected to a server 720 through the Internet 730 comprising: a) determining whether a prospective event-initiating user (704, 706, 708) is within listening proximity to a first short range wireless media playback device 710 adapted to receive playback wirelessly (105, 760) from a portable electronic user device and play media or music for at least one listener, and if so, b) connecting the portable electronic user device 750 to the wireless transceiver 710 wirelessly; c) inviting the prospective event-initiating user via a home screen of the integrated application 740 to make a selection.

A method for providing media playback to a media playback device 710 adapted to receive playback wirelessly through a plurality of portable electronic user devices 750 via an integrated application 740 connected to a server 720 through the Internet 730 comprising: a) determining whether a prospective event-initiating user (704, 706, 708) is within listening proximity to a first short range wireless media playback device 710 adapted to receive playback wirelessly (105, 760) from a portable electronic user device and play media or music for at least one listener, and if so, b) connecting the portable electronic user device 750 to the wireless transceiver 710 wirelessly; c) inviting the prospective event-initiating user via a home screen of the integrated application 740 to make a selection, where the selection is Host a party 500 or join a party 600.

A method for providing media playback to a media playback device 710 adapted to receive playback wirelessly through a plurality of portable electronic user devices 750 via an integrated application 740 connected to a server 720 through the Internet 730 comprising: a) determining whether a prospective event-initiating user (704, 706, 708) is within listening proximity to a first short range wireless media playback device 710 adapted to receive playback wirelessly (105, 760) from a portable electronic user device and play media or music for at least one listener, and if so, b) connecting the portable electronic user device 750 to the wireless transceiver 710 wirelessly; c) inviting the prospective event-initiating user via a home screen of the integrated application 740 to make a selection, where the selection is Host a party 500 further comprises: d) giving the user 501 a user role as a Host

502; e) creating settings for a party 504; f) viewing the party settings 506; g) editing the party settings 508; h) ending the party 510;

A method for providing media playback to a media playback device 710 adapted to receive playback wirelessly through a plurality of portable electronic user devices 750 via an integrated application 740 connected to a server 720 through the Internet 730 comprising: a) determining whether a prospective event-initiating user (704, 706, 708) is within listening proximity to a first short range wireless media playback device 710 adapted to receive playback wirelessly (105, 760) from a portable electronic user device and play media or music for at least one listener, and if so, b) connecting the portable electronic user device 750 to the wireless transceiver 710 wirelessly; c) inviting the prospective event-initiating user via a home screen of the integrated application 740 to make a selection, where the selection is join a party 600 further comprises: (d) giving the user 601 a user role as a Guest or DJ 602; (e) searching at least one party in close proximity 604 to the portable electronic user device 750; (f) connecting and joining the party 606; (g) selecting an option from viewing party settings (302, 608), searching and selecting songs (303, 610), be a music streaming DJ (305, 612), viewing user profile (307, 614), or leave a party 616.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a plurality of prospective event-initiating users (i.e. 501, 601, 701), where one user is a Host 704;

a plurality of portable electronic user devices 750 each for use by a unique user (i.e. 501, 601, 701), where the devices have party mode listening software 740;

a server with multi-user listening party management software 720;

a first wireless media playback signal, where the first signal originates from the first user device 750, where the first user device is among the plurality of portable electronic user devices 750;

a second wireless media playback signal, where the second signal originates from the second user device 750, where the second user device is among the plurality of portable electronic user devices 750; and a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a plurality of prospective event-initiating users (i.e. 501, 601, 701), where one user is a Host 704;

a plurality of portable electronic user devices 750 each for use by a unique user (i.e. 501, 601, 701), where the devices have party mode listening software 740;

a server with multi-user listening party management software 720;

a first wireless media playback signal, where the first signal originates from the first user device 750, where the first user device is among the plurality of portable electronic user devices 750;

a second wireless media playback signal, where the second signal originates from the second user device 750, where the second user device is among the plurality of portable electronic user devices 750; and a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where the wireless transceiver 710 is a wireless loudspeaker.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a plurality of prospective event-initiating users (i.e. 501, 601, 701), where one user is a Host 704;

a plurality of portable electronic user devices 750 each for use by a unique user (i.e. 501, 601, 701), where the devices have party mode listening software 740;

a server with multi-user listening party management software 720;

a first wireless media playback signal, where the first signal originates from the first user device 750, where the first user device is among the plurality of portable electronic user devices 750;

a second wireless media playback signal, where the second signal originates from the second user device 750, where the second user device is among the plurality of portable electronic user devices 750; and a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where the users are either a Host 704, Guest 708, or DJ 706.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a plurality of prospective event-initiating users (i.e. 501, 601, 701), where one user is a Host 704;

a plurality of portable electronic user devices 750 each for use by a unique user (i.e. 501, 601, 701), where the devices have party mode listening software 740;

a server with multi-user listening party management software 720;

a first wireless media playback signal, where the first signal originates from the first user device 750, where the first user device is among the plurality of portable electronic user devices 750;

a second wireless media playback signal, where the second signal originates from the second user device 750, where the second user device is among the plurality of portable electronic user devices 750; and a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where wirelessly means a Bluetooth connection (105, 760).

A method for providing and controlling media playback to a media playback device 710 adapted to receive, control and initiate wireless media data signals 125 from a first and second portable electronic user device 750 with an integrated application 740 connected to a server 720 via the Internet 730, comprising:

determining whether the first user device 750 for a first prospective event-initiating user (i.e. 501, 601, 701) is within listening proximity to the playback device, and if so, connecting the user device 750 to the wireless device 710 wirelessly;

inviting the first event-initiating user to make a selection via a home screen of the integrated application 740 to make a selection.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

determining whether the first user device 750 for a first prospective event-initiating user (i.e. 501, 601, 701) is within listening proximity to the playback device, and if so, connecting the user device 750 to the wireless device 710 wirelessly;

inviting the first event-initiating user to make a selection via a home screen of the integrated application 740 to make a selection, where the selection is Host a party 500 or join a party 600.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

determining whether the first user device 750 for a first prospective event-initiating user (i.e. 501, 601, 701) is within listening proximity to the playback device, and if so, connecting the user device 750 to the wireless device 710 wirelessly;

inviting the first event-initiating user to make a selection via a home screen of the integrated application 740 to make a selection, where the selection Host a party 500 further comprises: giving the user 501 a user role as a Host 502; creating settings for a party 504; viewing the party settings 506; editing the party settings 508; or ending the party 510.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

determining whether the first user device 750 for a first prospective event-initiating user (i.e. 501, 601, 701) is within listening proximity to the playback device, and if so, connecting the user device 750 to the wireless device 710 wirelessly;

inviting the first event-initiating user to make a selection via a home screen of the integrated application 740 to make a selection, where the selection join a party 600 further comprises:

giving the user 601 a user role as a Guest or DJ 602; searching at least one party in close proximity 604 to the portable electronic user device 750; connecting and joining the party 606; selecting an option from viewing party settings 608, searching and selecting songs 610, be a music streaming DJ 612, or viewing user profile 614.

A wireless loudspeaker configured to receive, control and initiate wireless media data signals 125 from a first and second portable electronic user device 750 with an integrated application 740 connected to a server 720 via the Internet 730, comprising:

a wireless transceiver 710 configured to receive streaming media data signals 125 from a selected plurality of portable electronic user devices 750 which are also connected to and responsive to a system 700 including a server 720 having multi-user listening party management software, and a controller programmed for receiving and playing the first playback signal and if a second playback signal is sent, receiving and holding the second playback signal in a queue until the first playback signal has finished playing or the controller is instructed to begin playing the second playback signal.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a) a plurality of prospective event-initiating users (i.e. 501, 601, 701), where one user is a host 704;

b) a plurality of portable electronic user devices 750 each for use by a unique user (i.e. 501, 601, 701), where the devices have party mode listening software 740;

c) a server with multi-user listening party management software 720;

d) a first wireless media playback signal, where the first signal originates from the first user device 750, where the first user device is among the plurality of portable electronic user devices 750;

e) a second wireless media playback signal, where the second signal originates from the second user device 750, where the second user device is among the plurality of portable electronic user devices 750; and f) a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a) a plurality of prospective event-initiating users (i.e. 501, 601, 701), where one user is a host 704;

b) a plurality of portable electronic user devices 750 each for use by a unique user (i.e. 501, 601, 701), where the devices have party mode listening software 740;

c) a server with multi-user listening party management software 720;

d) a first wireless media playback signal, where the first signal originates from the first user device 750, where the first user device is among the plurality of portable electronic user devices 750;

e) a second wireless media playback signal, where the second signal originates from the second user device 750, where the second user device is among the plurality of portable electronic user devices 750; and f) a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where the wireless transceiver 710 is a wireless loudspeaker.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a) a plurality of prospective event-initiating users (i.e. 501, 601, 701), where one user is a host 704;

b) a plurality of portable electronic user devices 750 each for use by a unique user (i.e. 501, 601, 701), where the devices have party mode listening software 740;

c) a server with multi-user listening party management software 720;

d) a first wireless media playback signal, where the first signal originates from the first user device 750, where the first user device is among the plurality of portable electronic user devices 750;

e) a second wireless media playback signal, where the second signal originates from the second user device 750, where the second user device is among the plurality of portable electronic user devices 750; and f) a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where the users are either a host 704, guest 708, or DJ 706.

A system for providing and controlling media playback to a media playback device 710 adapted to receive, control and initiate wireless media data signals 125 from a first and second portable electronic user device 750 with an integrated application 740 connected to a server 720 via the Internet 730, comprising:

a) a plurality of prospective event-initiating users (i.e. 501, 601, 701), where one user is a host 704;

b) a plurality of portable electronic user devices 750 each for use by a unique user (i.e. 501, 601, 701), where the devices have party mode listening software 740;

c) a server with multi-user listening party management software 720;

d) a first wireless media playback signal, where the first signal originates from the first user device 750, where the first user device is among the plurality of portable electronic user devices 750;

e) a second wireless media playback signal, where the second signal originates from the second user device 750, where the second user device is among the plurality of portable electronic user devices 750; and f) a wireless transceiver 710 configured to receive streaming media data signals 125 from a selected plurality of the portable electronic user devices 750 wirelessly and is also connected to and responsive to the server 720 and where the transceiver 710 has a controller programmed for receiving and playing the first playback signal and if a second playback signal is sent, receiving and holding the second playback signal in a queue until the first playback signal has finished playing or the controller is instructed to begin playing the second playback signal, where wirelessly means a Bluetooth connection (105, 760).

A method for providing and controlling media playback to a media playback device 710 adapted to receive, control and initiate wireless media data signals 125 from a first and second portable electronic user device 750 with an integrated application 740 connected to a server 720 via the Internet 730, comprising:

a) determining whether the first user device 750 for a first prospective event-initiating user (i.e. 501, 601, 701) is within listening proximity to the playback device, and if so, b) connecting the user device 750 to the wireless device 710 wirelessly;

c) inviting the first event-initiating user to make a selection via a home screen of the integrated application 740 to make a selection.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

a) determining whether the first user device 750 for a first prospective event-initiating user (i.e. 501, 601, 701) is within listening proximity to the playback device, and if so, b) connecting the user device 750 to the wireless device 710 wirelessly;

c) inviting the first event-initiating user to make a selection via a home screen of the integrated application 740 to make a selection, where the selection is host a party 500 or join a party 600.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

a) determining whether the first user device 750 for a first prospective event-initiating user (i.e. 501, 601, 701) is within listening proximity to the playback device, and if so, b) connecting the user device 750 to the wireless device 710 wirelessly;

c) inviting the first event-initiating user to make a selection via a home screen of the integrated application 740 to make a selection, where the selection host a party 500 further comprises:

i) giving the user (i.e. 501, 601, 701) a user role as a host 502;

ii) creating settings for a party 504;

iii) viewing the party settings 506;

iv) editing the party settings 508; and v) ending the party 510.

A method for providing and controlling media playback to a media playback device 710 adapted to receive, control and initiate wireless media data signals 125 from a first and second portable electronic user device 750 with an integrated application 740 connected to a server 720 via the Internet 730, comprising:

a) determining whether the first user device 750 for a first prospective event-initiating user (i.e. 501, 601, 701) is within listening proximity to the playback device, and if so, b) connecting the user device 750 to the wireless device 710 wirelessly; c) inviting the first event-initiating user to make a selection via a home screen of the integrated application 740 to make a selection, where the selection join a party 600 further comprises:

i) giving the user (i.e. 501, 601, 701) a user role as a guest or DJ 602;

ii) searching at least one party in close proximity 604 to the portable electronic user device 750;

iii) connecting and joining the party 606; and iv) selecting an option from viewing party settings 608, searching and selecting songs 610, be a music streaming DJ 612, viewing user profile 614, or leave a party 616.

A wireless loudspeaker configured to receive, control and initiate wireless media data signals 125 from a first and second portable electronic user device 750 with an integrated application 740 connected to a server 720 via the Internet 730, comprising:

a wireless transceiver 710 configured to receive streaming media data signals 125 from a selected plurality of portable electronic user devices 750 which are also connected to and responsive to a system 700 including a server 720 having multi-user listening party management software, and a controller programmed for receiving and playing the first playback signal and if a second playback signal is sent, receiving and holding the second playback signal in a queue until the first playback signal has finished playing or the controller is instructed to begin playing the second playback signal.

A system for controlling wireless media playback, comprising:

a) a first portable media playback and communication device 150 programmed and configured for use by a first prospective event-initiating user 501, where the first event-initiating user is designated as a "Host" 502, and the first portable media playback and communication device 150 being programmed with a Party Mode algorithm;

b) a first memory in the first device with a plurality of first-user media playback files 870;

c) a wireless transceiver in the first device configured to wirelessly transmit the first-user media playback files 870 as media playback signals in response to received media transmission control signals;

d) a second portable media playback and communication device 150 programmed and configured for use by second prospective event-initiating user 601, where the second event-initiating user is designated as a "DJ" or a "Guest" 602; and the second portable media playback 150 and communication device being programmed with the Party Mode algorithm;

e) a second memory in the second device with a plurality of second-user media playback files 870;

f) a wireless transceiver in the second device configured to wirelessly transmit the second-user media playback files 870 as media playback signals in response to received media transmission control signals;

g) a wireless media playback system 110 including a transceiver 115 configured to transmit and receive media transmission control signals;

h) a controller (116, 860) connected to and responsive to the wireless media playback system transceiver 115 and programmed to transmit media playback signals; and i) an audio amplifier 112 in the wireless media playback system connected to receive and amplify the media playback signals for playback over a transducer in response to wireless signals received from the first device 150 and the second device 150, via the wireless media playback system transceiver 115.

A system for controlling wireless media playback, comprising:

a) a first portable media playback and communication device 150 programmed and configured for use by a first prospective event-initiating user 501, where the first event-initiating user is designated as a "Host" 502, and the first portable media playback and communication device 150 being programmed with a Party Mode algorithm;

b) a first memory in the first device with a plurality of first-user media playback files 870;

c) a wireless transceiver in the first device configured to wirelessly transmit the first-user media playback files 870 as media playback signals in response to received media transmission control signals;

d) a second portable media playback and communication device 150 programmed and configured for use by second prospective event-initiating user 601, where the second event-initiating user is designated as a "DJ" or a "Guest" 602; and the second portable media playback 150 and communication device being programmed with the Party Mode algorithm;

e) a second memory in the second device with a plurality of second-user media playback files 870;

f) a wireless transceiver in the second device configured to wirelessly transmit the second-user media playback files 870 as media playback signals in response to received media transmission control signals;

g) a wireless media playback system 110 including a transceiver 115 configured to transmit and receive media transmission control signals;

h) a controller (116, 860) connected to and responsive to the wireless media playback system transceiver 115 and programmed to transmit media playback signals; and i) an audio amplifier 112 in the wireless media playback system connected to receive and amplify the media playback signals for playback over a transducer in response to wireless signals received from the first device 150 and the second device 150, via the wireless media playback system transceiver 115, where the wireless media playback system 110 and the media playback and communication devices 150 communicate wirelessly by way of a Bluetooth (105, 760) connection.

A system for controlling wireless media playback, comprising:

a) a first portable media playback and communication device 150 programmed and configured for use by a first prospective event-initiating user 501, where the first event-initiating user is designated as a "Host" 502, and the first portable media playback and communication device 150 being programmed with a Party Mode algorithm;

b) a first memory in the first device with a plurality of first-user media playback files 870;

c) a wireless transceiver in the first device configured to wirelessly transmit the first-user media playback files 870 as media playback signals in response to received media transmission control signals;

d) a second portable media playback and communication device 150 programmed and configured for use by second prospective event-initiating user 601, where the second event-initiating user is designated as a "DJ" or a "Guest" 602; and the second portable media playback 150 and communication device being programmed with the Party Mode algorithm;

e) a second memory in the second device with a plurality of second-user media playback files 870;

f) a wireless transceiver in the second device configured to wirelessly transmit the second-user media playback files 870 as media playback signals in response to received media transmission control signals;

g) a wireless media playback system 110 including a transceiver 115 configured to transmit and receive media transmission control signals;

h) a controller (116, 860) connected to and responsive to the wireless media playback system transceiver 115 and programmed to transmit media playback signals; and i) an audio amplifier 112 in the wireless media playback system connected to receive and amplify the media playback signals for playback over a transducer in response to wireless signals received from the first device 150 and the second device 150, via the wireless media playback system transceiver 115, where the wireless media playback system 110 and the media playback and communication devices 150 communicate wirelessly by way of a Bluetooth (105,760) connection, where the wireless media playback system transceiver 115 is connected to transfer received media playback request signals 864 from the first and the second portable media playback and communication devices 150 to the controller (116, 860).

A system for controlling wireless media playback, comprising:

a) a first portable media playback and communication device 150 programmed and configured for use by a first prospective event-initiating user 501, where the first event-initiating user is designated as a "Host" 502, and the first portable media playback and communication device 150 being programmed with a Party Mode algorithm;

b) a first memory in the first device with a plurality of first-user media playback files 870;

c) a wireless transceiver in the first device configured to wirelessly transmit the first-user media playback files 870 as media playback signals in response to received media transmission control signals;

d) a second portable media playback and communication device 150 programmed and configured for use by second prospective event-initiating user 601, where the second event-initiating user is designated as a "DJ" or a "Guest" 602; and the second portable media playback 150 and communication device being programmed with the Party Mode algorithm;

e) a second memory in the second device with a plurality of second-user media playback files 870;

f) a wireless transceiver in the second device configured to wirelessly transmit the second-user media playback files 870 as media playback signals in response to received media transmission control signals;

g) a wireless media playback system 110 including a transceiver 115 configured to transmit and receive media transmission control signals;

h) a controller (116, 860) connected to and responsive to the wireless media playback system transceiver 115 and programmed to transmit media playback signals; and i) an audio amplifier 112 in the wireless media playback system connected to receive and amplify the media playback signals for playback over a transducer in response to wireless signals received from the first device 150 and the second device 150, via the wireless media playback system transceiver 115, where the wireless media playback system 110 and the media playback and communication devices 150 communicate wirelessly by way of a Bluetooth (105,760) connection, where the wireless media playback system transceiver 115 is connected to transfer received media playback request signals 864 from the first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices;

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862.

A system for controlling wireless media playback, comprising:

a) a first portable media playback and communication device 150 programmed and configured for use by a first prospective event-initiating user 501, where the first event-initiating user is designated as a "Host" 502, and the first portable media playback and communication device 150 being programmed with a Party Mode algorithm;

b) a first memory in the first device with a plurality of first-user media playback files 870;

c) a wireless transceiver in the first device configured to wirelessly transmit the first-user media playback files 870 as media playback signals in response to received media transmission control signals;

d) a second portable media playback and communication device 150 programmed and configured for use by second prospective event-initiating user 601, where the second event-initiating user is designated as a "DJ" or a "Guest" 602; and the second portable media playback 150 and communication device being programmed with the Party Mode algorithm;

e) a second memory in the second device with a plurality of second-user media playback files 870;

f) a wireless transceiver in the second device configured to wirelessly transmit the second-user media playback files 870 as media playback signals in response to received media transmission control signals;

g) a wireless media playback system 110 including a transceiver 115 configured to transmit and receive media transmission control signals;

h) a controller (116, 860) connected to and responsive to the wireless media playback system transceiver 115 and programmed to transmit media playback signals; and i) an audio amplifier 112 in the wireless media playback system connected to receive and amplify the media playback signals for playback over a transducer in response to wireless signals received from the first device 150 and the second device 150, via the wireless media playback system transceiver 115, where the wireless media playback system 110 and the media playback and communication devices 150 communicate wirelessly by way of a Bluetooth (105,760) connection, where the wireless media playback system transceiver 115 is connected to transfer received media playback request signals 864 from the first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices (150, 850);

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862, further comprising:

(a) a Party Mode Network 840 including a Party Mode server (120, 820) connected to the first and the second portable media playback devices (150, 850).

A system for controlling wireless media playback, comprising:

A first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices (150, 850);

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862, further comprising:

(a) a Party Mode Network 840 including a Party Mode server (120, 820) connected to the first and the second portable media playback devices (150, 850), where, (a) the Party Mode server (120, 820) being connected to the first and the second portable media playback devices (150, 850) wirelessly; and (b) the Party Mode server 120 being connected to the first and the second portable media playback devices (150, 850) to receive data and respond to queries.

A system for controlling wireless media playback, comprising:

a first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices;

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862, further comprising:

(a) a Party Mode Network 840 including a Party Mode server (120, 820) connected to the first and the second portable media playback devices (150, 850), where the controller 115 includes a memory for storing media playback request signal 864 from the first and the second portable media playback devices (150, 850) in a queue 862 and the media playback file 870 corresponding to the media playback request signal 864 at the top of the queue 862.

A system for controlling wireless media playback, comprising:

a first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices;

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862, further comprising:

(a) a Party Mode Network 840 including a Party Mode server (120, 820) connected to the first and the second portable media playback devices (150, 850), where the party mode algorithm includes:

(a) a first control signal for communicating with the controller 115 to send media playback request signals 864 from the first and the second portable media playback device 150;

(b) the first control signal further communicating with the controller 115 to send the media playback file 870 in response to the request from the controller 115; and (c) a second control signal for communicating with the first and the second portable media playback device 150 to transmit data and send queries to the Party Mode server (120, 820).

A system for controlling wireless media playback, comprising:

a first and the second portable media playback and communication devices 150 to the controller (116, 860), where:

a) the controller (116, 860) incorporates a queue 862 for received media playback request signals 864;

b) the controller (116, 860) being connected to the wireless media playback system transceiver 115 to request a media playback file 870 corresponding to the media playback request signal 864 at the top of the queue 862 from the first and second portable media playback devices;

c) the controller (116, 860) being connected to the audio amplifier 112 to control playback of the media playback files 870 by initiating and terminating playback; and d) the controller (116, 860) being further connected to remove the media playback request signal 864 at the top of the queue 862 upon termination of playback and to set the next sequential media playback request signal 864 as the top of the queue 862, further comprising:

(a) a Party Mode Network 840 including a Party Mode server (120, 820) connected to the first and the second portable media playback devices (150, 850), further including a multiplicity of portable media playback and communication devices, where the:

(a) the portable devices being connected to the Party Mode Network 840 to view all media playback request signals 864 sent to the controller 115 and create a shared party media playlist.

A method for providing and controlling media playback, comprising:

a) connecting 902 at least a first and a second portable media playback and communication device 150 to a wireless media playback system 110 wirelessly;

b) transmitting 904 media playback request signals 864 for media playback files 870 wirelessly from the first and second portable media playback devices (150, 850) to the wireless media playback system 110;

c) receiving 906 the media playback request signals 864;

d) storing 908 the media playback request signals 864 received from the first and second portable media playback device sequentially in a queue 862;

e) selecting and requesting 910 the media playback file 870 corresponding to a media playback request signal 864 at the top of the queue 862 from a corresponding one of the first and second portable media playback devices (150, 850);

f) receiving 912 the selected media playback file 870 and transmitting corresponding media playback signals to a transducer 115 via the wireless media playback system;

g) controlling playback 914 of the selected media playback files 870 by initiating and terminating playback 916; and h) removing 918 the media playback request signal 864 at the top of the queue 862 upon termination of playback and setting 920 the next sequential media playback request signal 864 as the top of the queue 862 and repeating steps (e) to (h) until the queue 862 is empty 921.

A method for providing and controlling media playback, comprising:

a) connecting at least a first and a second portable media playback and communication device 150 to a wireless media playback system 110 wirelessly;

b) transmitting media playback request signals 864 for media playback files 870 wirelessly from the first and second portable media playback devices (150, 850) to the wireless media playback system 110;

c) receiving the media playback request signals 864;

d) storing the media playback request signals 864 received from the first and second portable media playback device 150 sequentially in a queue 862;

e) selecting and requesting the media playback file 870 corresponding to a media playback request signal 864 at the top of the queue 862 from a corresponding one of the first and second portable media playback devices;

f) receiving the selected media playback file 870 and transmitting corresponding media playback signals to a transducer 115 via the wireless media playback system 110;

g) controlling playback of the selected media playback files 870 by initiating and terminating playback; and h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices (150, 850) to view all media playback request signals 864 sent to the wireless media playback system; and (b) connecting the first and the second portable media playback devices (150, 850) to the Party Mode Network 840 wirelessly to facilitate creating a shared party media playlist with the first and second portable media playback devices (150, 850) via a Party Mode algorithm.

A method for providing and controlling media playback, comprising:

a) connecting at least a first and a second portable media playback and communication device 150 to a wireless media playback system 110 wirelessly;

b) transmitting media playback request signals 864 for media playback files 870 wirelessly from the first and second portable media playback devices (150, 850) to the wireless media playback system 110;

c) receiving the media playback request signals 864;

d) storing the media playback request signals 864 received from the first and second portable media playback device 150 sequentially in a queue 862;

e) selecting and requesting the media playback file 870 corresponding to a media playback request signal 864 at the top of the queue 862 from a corresponding one of the first and second portable media playback devices;

f) receiving the selected media playback file 870 and transmitting corresponding media playback signals to a transducer via the wireless media playback system 110;

g) controlling playback of the selected media playback files 870 by initiating and terminating playback; and h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices to view all media playback request signals 864 sent to the wireless media playback system 110; and (b) connecting the first and the second portable media playback devices (150, 850) to the Party Mode Network 840 wirelessly to facilitate creating a shared party media playlist with the first and second portable media playback devices (150, 850) via a Party Mode algorithm, where the connecting to a Party Mode Network 840 wirelessly further comprises connecting a first one of the first and the second portable media playback devices (150, 850) to host a party 500.

A method for providing and controlling media playback, comprising:

a) connecting at least a first and a second portable media playback and communication device 150 to a wireless media playback system 110 wirelessly;

b) transmitting media playback request signals 864 for media playback files 870 wirelessly from the first and second portable media playback devices (150, 850) to the wireless media playback system 110;

c) receiving the media playback request signals 864;

d) storing the media playback request signals 864 received from the first and second portable media playback device 150 sequentially in a queue 862;

e) selecting and requesting the media playback file 870 corresponding to a media playback request signal 864 at the top of the queue 862 from a corresponding one of the first and second portable media playback devices;

f) receiving the selected media playback file 870 and transmitting corresponding media playback signals to a transducer via the wireless media playback system 110;

g) controlling playback of the selected media playback files 870 by initiating and terminating playback; and h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices to view all media playback request signals 864 sent to the wireless media playback system 110; and (b) connecting the first and the second portable media playback devices (150, 850) to the Party Mode Network 840 wirelessly to facilitate creating a shared party media playlist with the first and second portable media playback devices (150, 850) via a Party Mode algorithm, where the connecting to a Party Mode Network 840 wirelessly further comprises connecting a first one of the first and the second portable media playback devices (150, 850) to host a party 500, where the hosting a party comprises the steps of:

a) creating settings for said party 504;

b) viewing 506 and editing 508 said party settings;

c) viewing said shared party media playlist 505;

d) submitting at least one media playback request signal 864, wherein said media playback request signal 864 is a media submission for said shared media playlist 507;

e) transmitting said media playback file 870 of said media playback request signal 864 upon request from said wireless media playback system 509;

f) viewing a profile on said first and second media playback devices 503;

g) voting on said media playback request signals 864 on said shared media playlist 511; and h) ending said party 510.

A method for providing and controlling media playback, comprising:

a) connecting at least a first and a second portable media playback and communication device 150 to a wireless media playback system 110 wirelessly;

b) transmitting media playback request signals 864 for media playback files 870 wirelessly from the first and second portable media playback devices (150, 850) to the wireless media playback system 110;

c) receiving the media playback request signals 864;

d) storing the media playback request signals 864 received from the first and second portable media playback device 150 sequentially in a queue 862;

e) selecting and requesting the media playback file 870 corresponding to a media playback request signal 864 at the top of the queue 862 from a corresponding one of the first and second portable media playback devices;

f) receiving the selected media playback file 870 and transmitting corresponding media playback signals to a transducer 115 via the wireless media playback system 110;

g) controlling playback of the selected media playback files 870 by initiating and terminating playback; and h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices (150, 850) to view all media playback request signals 864 sent to the wireless media playback system; and (b) connecting the first and the second portable media playback devices (150, 850) to the Party Mode Network 840 wirelessly to facilitate creating a shared party media playlist with the first and second portable media playback devices (150, 850) via a Party Mode algorithm, where the connecting to a Party Mode Network 840 wirelessly further comprises connecting a second one of the first and the second portable media playback devices to join an existing party 600.

A method for providing and controlling media playback, comprising:

a) connecting at least a first and a second portable media playback and communication device 150 to a wireless media playback system 110 wirelessly;

b) transmitting media playback request signals 864 for media playback files 870 wirelessly from the first and second portable media playback devices (150, 850) to the wireless media playback system 110;

c) receiving the media playback request signals 864;

d) storing the media playback request signals 864 received from the first and second portable media playback device 150 sequentially in a queue 862;

e) selecting and requesting the media playback file 870 corresponding to a media playback request signal 864 at the top of the queue 862 from a corresponding one of the first and second portable media playback devices;

f) receiving the selected media playback file 870 and transmitting corresponding media playback signals to a transducer 115 via the wireless media playback system 110;

g) controlling playback of the selected media playback files 870 by initiating and terminating playback; and h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices (150, 850) to view all media playback request signals 864 sent to the wireless media playback system; and b) connecting the first and the second portable media playback devices (150, 850) to the Party Mode Network 840 wirelessly to facilitate creating a shared party media playlist with the first and second portable media playback devices (150, 850) via a Party Mode algorithm, where the connecting to a Party Mode Network 840 wirelessly further comprises connecting a second one of the first and the second portable media playback devices to join an existing party 600, where the joining a party comprises the steps of:
a) searching for said party in close proximity to said wireless media playback system 604;
b) connecting to said party 606;
c) viewing said shared party media playlist 605;
d) submitting at least one media playback request signal 864, wherein said media playback request signal 864 is a media submission for said shared media playlist 610; and
e) transmitting said media playback file 870 of said media playback request signal 864 upon request from said wireless media playback system 609;
f) viewing a profile on said first and second media playback devices 614;
g) voting on said media playback request signals 864 on said shared media playlist 611; and
h) leaving said party 616.

A method for providing and controlling media playback, comprising:

a) connecting at least a first and a second portable media playback and communication device 150 to a wireless media playback system 110 wirelessly;
b) transmitting media playback request signals 864 for media playback files 870 wirelessly from the first and second portable media playback devices (150, 850) to the wireless media playback system 110;
c) receiving the media playback request signals 864;
d) storing the media playback request signals 864 received from the first and second portable media playback device 150 sequentially in a queue 862;
e) selecting and requesting the media playback file 870 corresponding to a media playback request signal 864 at the top of the queue 862 from a corresponding one of the first and second portable media playback devices;
f) receiving the selected media playback file 870 and transmitting corresponding media playback signals to a transducer 115 via the wireless media playback system 110;
g) controlling playback of the selected media playback files 870 by initiating and terminating playback; and
h) removing the media playback request signal 864 at the top of the queue 862 upon termination of playback and setting the next sequential media playback request signal 864 as the top of the queue 862 and repeating steps (e) to (h) until the queue 862 is empty, further comprises:

a) creating a Party network for creating a party, where the party allows a team of at least the first and the portable media playback devices (150, 850) to view all media playback request signals 864 sent to the wireless media playback system; and b) connecting the first and the second portable media playback devices (150, 850) to the Party Mode Network 840 wirelessly to facilitate creating a shared party media playlist with the first and second portable media playback devices (150, 850) via a Party Mode algorithm, where the connecting to a Party Mode Network 840 wirelessly further comprises connecting the first and the second portable media playback devices either to host a party or to join an existing party, where the:

a) hosting a party includes:
a) creating settings for said party 504;
b) viewing 506 and editing 508 said party settings;
c) viewing said shared party media playlist 505;
d) submitting at least one media playback request signal 864, wherein said media playback request signal 864 is a media submission for said shared media playlist 507;
e) transmitting said media playback file 870 of said media playback request signal 864 upon request from said wireless media playback system 509;
f) viewing a profile on said first and second media playback devices 503;
g) voting on said media playback request signals 864 on said shared media playlist 511; and
h) ending said party 510;

b) joining a party includes:
a) searching for said party in close proximity to said wireless media playback system 604;
b) connecting to said party 606;
c) viewing said shared party media playlist 605;
d) submitting at least one media playback request signal 864, wherein said media playback request signal 864 is a media submission for said shared media playlist 610; and
e) transmitting said media playback file 870 of said media playback request signal 864 upon request from said wireless media playback system 609;
f) viewing a profile on said first and second media playback devices 614;
g) voting on said media playback request signals 864 on said shared media playlist 611; and
h) leaving said party 616.

A wireless loudspeaker 110 for providing and controlling media playback, comprising:

(a) a wireless transceiver 115 configured to transmit and receive media transmission control signals;

(b) a controller (116, 860) connected to and responsive to the wireless loudspeaker transceiver 1151 and programmed to transmit media playback signals; and (c) an audio amplifier 112 in the wireless loudspeaker 110 connected to receive and amplify the media playback signals for playback over a transducer in response to wireless signals from the wireless loudspeaker transceiver 115.

A wireless loudspeaker for providing and controlling media playback, comprising:

(a) a wireless transceiver 115 configured to transmit and receive media transmission control signals;

(b) a controller (116, 860) connected to and responsive to the wireless loudspeaker transceiver 115 and programmed to transmit media playback signals; and (c) an audio amplifier 112 in the wireless loudspeaker connected to receive and amplify the media playback signals for playback over a transducer in response to wireless signals from the wireless loudspeaker transceiver 115, where the wireless signals are received from a first device and a second device 150.

Persons of skill in the art will appreciate that alternative embodiments are made available by the present invention. The method of the present invention may be practiced in a system including a loudspeaker connected by wire to a network that includes these same portable media (e.g., MP3) players, smartphones and other personal electronics devices (e.g. 150).

Having described preferred embodiments of a new and improved method, it is believed that other modifications, variations and changes will be suggested to those skilled in the art in view of the teachings set forth herein. It is therefore to be understood that all such variations, modifications and changes are believed to fall within the scope of the present invention as set forth in the claims.

We claim:

1. A system for controlling wireless media playback, comprising:
   a) a first portable media playback and communication device programmed and configured for use by a first prospective event-initiating user, wherein said first event-initiating user is designated as a "Host", said first portable media playback and communication device being programmed with a Party Mode algorithm;
   b) a first memory in said first device with a plurality of first-user media playback files;
   c) a wireless transceiver in said first device configured to wirelessly transmit said first-user media playback files as media playback signals in response to received media transmission control signals;
   d) a second portable media playback and communication device programmed and configured for use by second prospective event-initiating user, wherein said second event-initiating user is designated as a "DJ" or a "Guest"; said second portable media playback and communication device being programmed with said Party Mode algorithm;
   e) a second memory in said second device with a plurality of second-user media playback files;
   f) a wireless transceiver in said second device configured to wirelessly transmit said second-user media playback files as media playback signals in response to received media transmission control signals; and
   g) a wireless media playback system including a transceiver configured to transmit and receive media transmission control signals;
   h) a controller connected to and responsive to said wireless media playback system transceiver and programmed to transmit media playback signals; and
   i) an audio amplifier in said wireless media playback system connected to receive and amplify said media playback signals for playback over a transducer in response to wireless signals received from said first device and said second device, via said wireless media playback system transceiver.

2. The system of claim 1, wherein said wireless media playback system and said media playback and communication devices communicate wirelessly by way of a Bluetooth connection.

3. The system of claim 2, wherein said wireless media playback system transceiver is connected to transfer received media playback request signals from said first and said second portable media playback and communication devices to said controller.

4. The system of claim 3 wherein:
   a) said controller incorporates a queue for received media playback request signals;
   b) said controller being connected to said wireless media playback system transceiver to request a media playback file corresponding to the media playback request signal at the top of said queue from said first and second portable media playback devices;
   c) said controller being connected to said audio amplifier to control playback of said media playback files by initiating and terminating playback; and
   d) said controller being further connected to remove said media playback request signal at the top of said queue upon termination of playback and to set the next sequential media playback request signal as the top of said queue.

5. The system of claim 4, further comprising:
   (a) a Party Mode network including a Party Mode server connected to said first and said second portable media playback devices.

6. The system of claim 5, wherein
   (a) said Party Mode server being connected to said first and said second portable media playback devices wirelessly; and
   (b) said Party Mode server being connected to said first and said second portable media playback devices to receive data and respond to queries.

7. The system of claim 5, wherein said controller includes a memory for storing media playback request signals from said first and said second portable media playback devices in a queue and said media playback file corresponding to the media playback request signal at the top of said queue.

8. The system of claim 5, wherein said party mode algorithm includes:
   (a) a first control signal for communicating with said controller to send media playback request signals from said first and said second portable media playback device;
   (b) said first control signal further communicating with said controller to send said media playback file in response to said request from said controller; and
   (c) a second control signal for communicating with said first and said second portable media playback device to transmit data and send queries to said Party Mode server.

9. The system of claim 5, further including a multiplicity of portable media playback and communication devices, wherein:
   (a) said portable devices being connected to said Party Mode Network to view all media playback request signals sent to said controller and create a shared party media playlist.

10. A method for providing and controlling media playback, comprising:
   a) connecting at least a first and a second portable media playback and communication device to a wireless media playback system wirelessly;
   b) transmitting media playback request signals for media playback files wirelessly from said first and second portable media playback devices to said wireless media playback system;
   c) receiving said media playback request signals;
   d) storing said media playback request signals received from said first and second portable media playback device sequentially in a queue;
   e) selecting and requesting the media playback file corresponding to a media playback request signal at the top of said queue from a corresponding one of said first and second portable media playback devices;

f) receiving the selected media playback file and transmitting corresponding media playback signals to a transducer via said wireless media playback system;

g) controlling playback of said selected media playback files by initiating and terminating playback; and h) removing the media playback request signal at the top of said queue upon termination of playback and setting the next sequential media playback request signal as the top of the queue and repeating steps (e) to (h) until said queue is empty.

11. The method of claim 10, further comprises:

a) creating a Party network for creating a party, wherein said party allows a team of at least said first and said portable media playback devices to view all media playback request signals sent to said wireless media playback system; and (b) connecting said first and said second portable media playback devices to said Party Mode network wirelessly to facilitate creating a shared party media playlist with said first and second portable media playback devices via a Party Mode algorithm.

12. The method of claim 11, wherein connecting to a Party Mode network wirelessly further comprises connecting a first one of said first and said second portable media playback devices to host a party.

13. The method of claim 12, wherein hosting a party comprises the steps of:

a) creating settings for said party;
b) viewing and editing said party settings;
c) viewing said shared party media playlist;
d) submitting at least one media playback request signal, wherein said media playback request signal is a media submission for said shared media playlist;
e) transmitting said media playback file of said media playback request signal upon request from said wireless media playback system;
f) viewing a profile on said first and second media playback devices;
g) voting on said media playback request signals on said shared media playlist; and
h) ending said party.

14. The method of claim 11, wherein connecting to a Party Mode network wirelessly further comprises connecting a second one of said first and said second portable media playback devices to join an existing party.

15. The method of claim 14, wherein joining a party comprises the steps of:

a) searching for said party in close proximity to said wireless media playback system;
b) connecting to said party;
c) viewing said shared party media playlist;
d) submitting at least one media playback request signal, wherein said media playback request signal is a media submission for said shared media playlist; and
e) transmitting said media playback file of said media playback request signal upon request from said wireless media playback system;
f) viewing a profile on said first and second media playback devices;
g) voting on said media playback request signals on said shared media playlist; and
h) leaving said party.

16. The method of claim 11, wherein connecting to a Party Mode network wirelessly further comprises connecting said first and second portable media playback devices either to host a party or to join an existing party, wherein:

a) hosting a party includes:
  i) creating settings for said party;
  ii) viewing and editing said party settings;
  iii) viewing said shared party media playlist;
  iv) submitting at least one media playback request signal, wherein said media playback request signal is a media submission for said shared media playlist;
  v) transmitting said media playback file of said media playback request signal upon request from said wireless media playback system;
  vi) viewing a profile on said first and second media playback devices;
  vii) voting on said media playback request signals on said shared media playlist; and
  viii) ending said party;

b) joining a party includes:
  i) searching for said party in close proximity to said wireless media playback system;
  ii) connecting to said party;
  iii) viewing said shared party media playlist;
  iv) submitting at least one media playback request signal, wherein said media playback request signal is a media submission for said shared media playlist;
  v) transmitting said media playback file of said media playback request signal upon request from said wireless media playback system;
  vi) viewing a profile on said first and second media playback devices;
  vii) voting on said media playback request signals on said shared media playlist; and
  viii) leaving said party.

17. A wireless loudspeaker for providing and controlling media playback, comprising:

(a) a wireless transceiver configured to transmit and receive media transmission control signals and media playback signals;

(b) a controller with a memory connected to and responsive to said wireless loudspeaker transceiver and programmed to transmit media playback signals in response to said media transmission control signals;

(c) an audio amplifier in said wireless loudspeaker connected to receive and amplify said media playback signals for playback over a transducer in response to wireless signals from said wireless loudspeaker transceiver;

(d) wherein said wireless transceiver and said controller are configured and programmed to receive and demodulate the media transmission control signals and the media playback signals to generate a baseband media playback signal for playback over said transducer; and (e) wherein said controller is configured and programmed to operate in two modes, namely (e1) a first "normal" mode, to function in a manner similar to a standard Bluetooth™ speaker system, and (e2) a second "party" mode, to functions within a multi-user system as a multi-user media playback component which is simultaneously wirelessly connected with a selected plurality of distinct users' personal electronic devices or smartphones.

18. The wireless loudspeaker of claim 17, wherein said controller, when in said "party" mode, is configured and programmed to:

a) connect with at least a first and a second portable media playback and communication device or smartphone to a wireless media playback system wirelessly;

b) receive and process media playback request signals for media playback files wirelessly from said first and second portable media playback devices to said wireless loudspeaker receiver;
c) store said media playback request signals received from said first and second portable media playback device sequentially in a queue in said controller's memory;
d) select and request the media playback file corresponding to a media playback request signal at the top of said queue from a corresponding one of said first and second portable media playback devices;
f) receive the selected media playback file and transmitting corresponding media playback signals to a transducer via said wireless media playback system; and
g) control playback of said selected media playback files by initiating and terminating playback.

\* \* \* \* \*